(12) United States Patent
Mitsuishi et al.

(10) Patent No.: US 10,409,749 B2
(45) Date of Patent: Sep. 10, 2019

(54) SEMICONDUCTOR DEVICE AND SYSTEM PROVIDED WITH A COMMUNICATION INTERFACE

(71) Applicant: Renesas Electronics Corporation, Tokyo (JP)

(72) Inventors: Naoki Mitsuishi, Tokyo (JP); Seiji Ikari, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/144,580

(22) Filed: May 2, 2016

(65) Prior Publication Data

US 2017/0019142 A1 Jan. 19, 2017

(30) Foreign Application Priority Data

Jul. 15, 2015 (JP) .................................. 2015-141224

(51) Int. Cl.
*H04B 1/44* (2006.01)
*H04B 1/401* (2015.01)
*G06F 13/38* (2006.01)

(52) U.S. Cl.
CPC ........... *G06F 13/385* (2013.01); *H04B 1/401* (2013.01); *H04B 1/44* (2013.01); *Y02D 10/14* (2018.01); *Y02D 10/151* (2018.01)

(58) Field of Classification Search
CPC ......... H04B 1/44; H04B 1/401; G06F 13/385; G06F 9/48; Y02D 10/14; Y02D 10/151
See application file for complete search history.

(56) References Cited

U.S. PATENT DOCUMENTS

| | | | | |
|---|---|---|---|---|
| 5,327,436 A * | 7/1994 | Miyazaki | ............... | H03M 13/09 714/775 |
| 5,790,895 A * | 8/1998 | Krontz | .................. | G06F 9/5011 710/240 |
| 6,381,661 B1 * | 4/2002 | Messerly | ................ | G06F 13/24 710/305 |
| 8,645,742 B2 | 2/2014 | Mitsuishi | | |

(Continued)

FOREIGN PATENT DOCUMENTS

| | | |
|---|---|---|
| JP | H08-185363 A | 7/1996 |
| JP | 2005-293283 A | 10/2005 |

(Continued)

OTHER PUBLICATIONS

Japanese Office Action dated Mar. 12, 2019, in corresponding Japanese Patent Application No. 2015-141224, with an English translation thereof.

*Primary Examiner* — Sophia Vlahos
(74) *Attorney, Agent, or Firm* — McGinn I.P. Law Group, PLL.

(57) ABSTRACT

An SCI can perform transmission only or reception only, however, it is necessary to reset the SCI when transmission and reception is switched to transmission only or to reception only. A semiconductor device includes an interface circuit which performs a sequential communication of transmit or receive according to a synchronous clock. The interface circuit includes a register to specify an operation enabled state which is at least one of a transmit state and a receive state, and a mode control circuit to change at least one mode of transmit or receive in the operation enabled state.

18 Claims, 15 Drawing Sheets

(56) References Cited

U.S. PATENT DOCUMENTS

| | | | |
|---|---|---|---|
| 2005/0021892 A1* | 1/2005 | Kim | G06F 13/385 |
| | | | 710/62 |
| 2006/0095642 A1* | 5/2006 | Hesse | G06F 13/385 |
| | | | 710/313 |
| 2007/0022219 A1 | 1/2007 | Yasui | |
| 2010/0274934 A1* | 10/2010 | Nakayama | G06F 13/4295 |
| | | | 710/33 |
| 2014/0146861 A1* | 5/2014 | Li | H04B 1/40 |
| | | | 375/219 |
| 2015/0193367 A1 | 7/2015 | Mitsuishi et al. | |
| 2015/0378794 A1* | 12/2015 | Sato | G06F 9/54 |
| | | | 719/328 |

FOREIGN PATENT DOCUMENTS

| | | |
|---|---|---|
| JP | 2009-110335 A | 5/2009 |
| JP | 2011-114630 A | 6/2011 |

* cited by examiner

FIG. 3

| bit | 7 | 6 | 5 | 4 | 3 | 2 | 1 | 0 |
|---|---|---|---|---|---|---|---|---|
| SMR | - | - | - | - | - | - | CKS1 | CKS0 |
| SCR | TIE | RIE | TE | RE | - | - | CKE | - |
| SSR | TDRE | RDRF | ORER | - | - | - | - | - |
| SFCR | - | - | TD | RD | - | - | CMD | - |
| TDR | | | | | | | | |
| RDR | | | | | | | | |

FIG. 6

| bit | 31 — 16 | 15 — 0 |
|---|---|---|
| MR | TLU, BRM, —, —, MDCE, MDC[2], MDC[1], MDC[0], —, SF[2], SF[1], SF[0], —, —, ISz[1], ISz[0], SM1, SM0, DM1, DM0, TDM1, TDM0, DIR, —, Sz[1], Sz[0], —, —, —, CRE, NXTE1, NXTE0 | |
| SAR1 | | |
| SAR2 | | |
| DAR | | |
| CR | BTCR | TCRH / TCRL |

SEMICONDUCTOR DEVICE AND SYSTEM PROVIDED WITH A COMMUNICATION INTERFACE

CROSS-REFERENCE TO RELATED APPLICATIONS

The disclosure of Japanese Patent Application No. 2015-141224 filed on Jul. 15, 2015 including the specification, drawings, and abstract is incorporated herein by reference in its entirety.

BACKGROUND

The present disclosure is related to a semiconductor device and applicable to a semiconductor device provided with a serial communication interface (SCI), for example.

A microcomputer comprised of a semiconductor integrated circuit is widely employed for the appliance control application. An SCI is employed for communication between microcomputers (for example, Japanese Unexamined Patent Application Publication No. 2011-114630). The SCI transmits or receives data on a bit-by-bit basis. The SCI in a clock synchronous mode performs transmission and reception, defining a period from a certain falling edge of the clock to the following falling edge as one bit. A simultaneous transmit-receive operation is performed by three lines of a clock line, a transmission line, and a reception line. The clock synchronous system is employed for comparatively high-speed communication.

(Patent Literature 1) Japanese Unexamined Patent Application Publication No. 2011-114630

SUMMARY

It is possible for the SCI to perform transmission only or reception only. However, it is necessary to reset the SCI when transmission and reception is switched to transmission only or to reception only.

The other issues and new features of the present invention will become clear from the description of the present invention and the accompanying drawings.

The following explains briefly the outline of a typical embodiment of the present disclosure. That is, the semiconductor device includes an interface circuit which performs a sequential communication of transmit or receive. The interface circuit includes a register to specify an operation enabled state which is at least one of a transmit state and a receive state, and a mode control circuit to change at least one mode of transmit or receive in the operation enabled state.

According to the semiconductor device described above, it is possible to easily change the transmit mode or the receive mode.

BRIEF DESCRIPTION OF THE DRAWINGS

FIG. 3 is a drawing illustrating a register structure of the SCI illustrated in FIG. 1A;

FIG. 6 is a drawing illustrating data transfer information of a DTC illustrated in FIG. 1A;

DETAILED DESCRIPTION

Figure 1A:
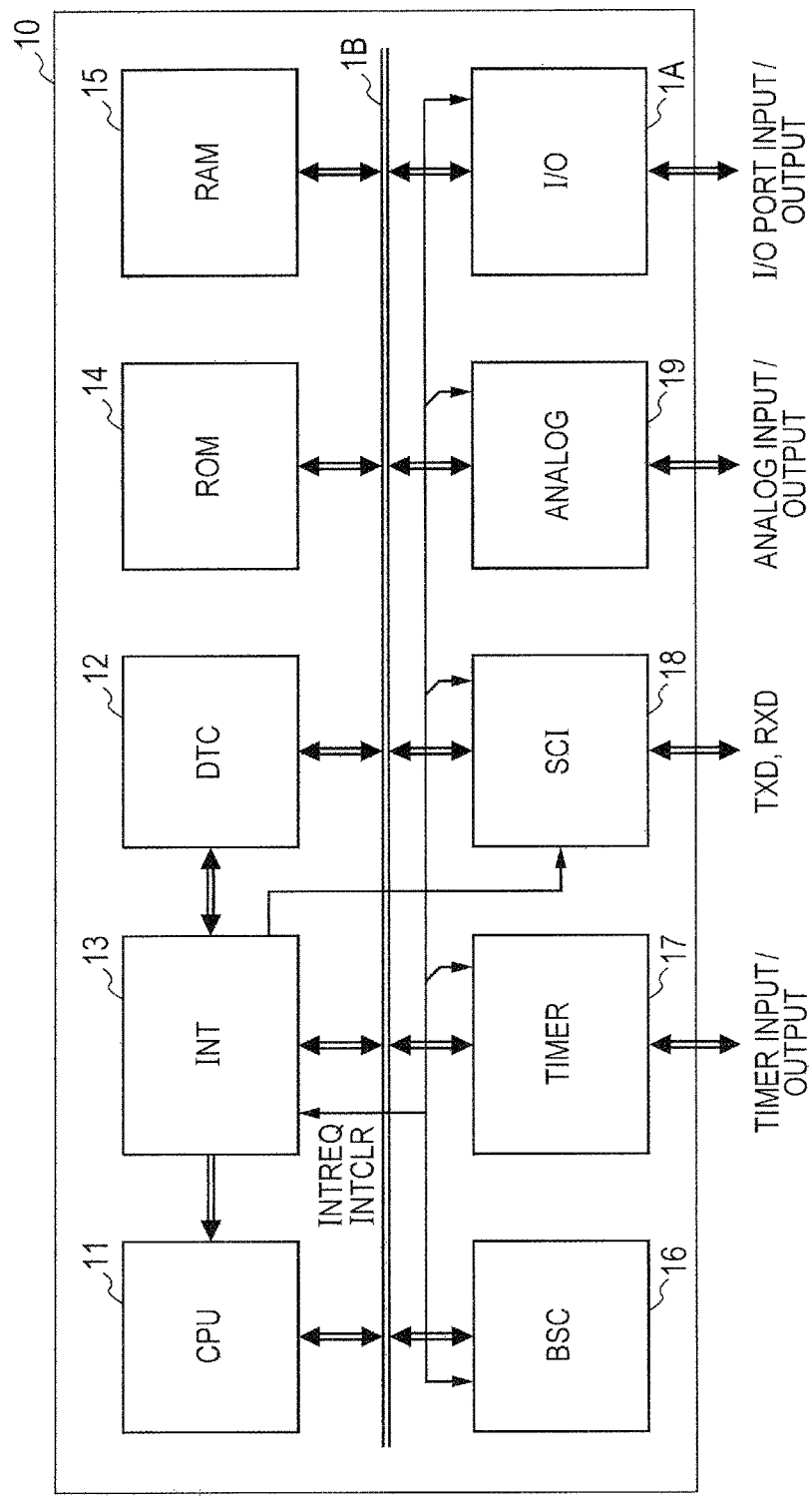
FIG. 1A is a block diagram for explaining a configuration of a microcomputer according to an implementation example.

Hereinafter, an embodiment, an implementation example, and an application are explained with reference to drawings. In the following explanation, the same symbol or reference numeral is attached to the same element and the repeated explanation thereof may be omitted.

First, problems involved in the SCI which the inventors of the present invention have examined are explained. In a simultaneous transmit-receive operation in a clock synchronous mode, when either transmit or receive is in an undesired state, it is difficult to perform a desired operation. For example, when transmit data is not provided, a desired simultaneous transmit-receive operation cannot be realized in principle; accordingly, both of the transmit and the receive are often made not to operate when implemented.

When the simultaneous transmit-receive operation and the transmit-only operation or the receive-only operation are switched, it is necessary to change the setup of the SCI. In changing the setup, a standby time may be required. The standby time is necessary for the initialization of the internal operation for the SCI to perform a sequential operation, and the measurement of the standby time is performed. The change of the setup and the measurement of the standby time are processing which is directly unrelated to the net communication. Accordingly, it is difficult for the data transfer device such as a data transfer controller (DTC) to take on such processing. It is also difficult to realize the speeding up of the processing.

Contents of the communication change depending on a system in which a microcomputer is used. Generally, in a control application, a command and the accompanying data are included in the contents of the communication in many cases. The receiving side of the command cannot determine the subsequent operation (transmit or receive) without determining the contents of the command. A command and the data length of the accompanying communication change depending on a system, and the data length is considered to change, corresponding to the command. For example, a command is in units of 8 bits and the accompanying communication is in units of 32 bits.

For example, when a command transmission and reception is performed in a system which performs a simultaneous transmit-receive operation, data used as a pair does not exist in many cases, therefore, it is necessary that the simultaneous transmit-receive operation is maintained as it is, and that the command receiving side (slave) provides dummy transmit data, and that the command transmitting side (master) disregards the dummy receive data. These kinds of processing on the dummy transmit data and the dummy receive data are originally unnecessary. Alternatively, it is necessary to change the setup such that the master performs a transmit only and the slave performs a receive only. In this case, the processing of changing the setup and the measurement of the standby time become necessary.

Embodiment

Figure 13:
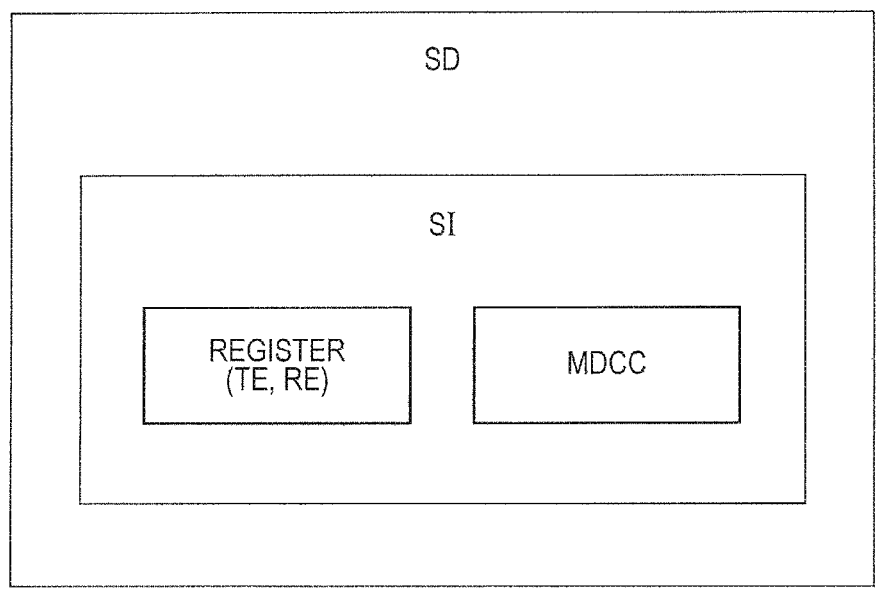
FIG. 13 is a block diagram illustrating a configuration of a semiconductor device according to an embodiment of the present invention.

FIG. 13 is a block diagram illustrating a configuration of a semiconductor device according to the embodiment.

The semiconductor device (SD) includes an interface circuit (SI) which performs a sequential communication of transmit or receive in synchronization with a synchronous clock. The interface circuit (SI) includes a register (REGISTER) to specify an operation enabled state which is at least one of a transmit state and a receive state, and a mode control circuit (MDCC) to change at least one mode of transmit and receive in the operation enabled state. According to the present semiconductor device, it is possible to change easily from a transmit-receive mode to a transmit mode or to a receive mode and it is possible to change the communication mode without requiring a standby time.

(Implementation Example)

FIG. 1A is a block diagram illustrating a configuration of a microcomputer according to an implementation example. The microcomputer (a micro controller unit: hereinafter called an MCU) 10 is a semiconductor device which corresponds SD in FIG. 13 and which includes functional blocks or modules illustrated in FIG. 1A over one semiconductor substrate. That is, the MCU 10 includes a central processing unit (hereinafter called a CPU) 11, a data transfer device (data transfer controller: hereinafter called a DTC) 12, an interrupt controller (INT) 13, a read only memory (hereinafter called an ROM) 14, and a random access memory (hereinafter called an RAM) 15. The MCU 10 further includes a bus controller (hereinafter called a BSC) 16, a timer (TIMER) 17, an SCI (Serial Communication Interface) 18 which corresponds SI in FIG. 13, an analog module (ANALOG) 19 such as an A/D (Analog/Digital) converter and a D/A (Digital/Analog) converter, and an input/output port (I/O) 1A.

The CPU 11 functioning as the core of operation in the MCU 10 operates by reading an instruction mainly from the ROM 14. The ROM 14 is comprised of a nonvolatile memory, such as a flash memory which is an electrically rewritable memory. The DTC 12 performs data transfer instead of the CPU 11 based on a setup by the CPU 11.

The INT 13 receives an interruption request (INTREQ) from the BSC 16, the timer 17, the SCI 18, and the analog module 19, and an interruption request (INTREQ) from the I/O 1A based on external interrupt request signals from the exterior of the MCU 10, and outputs an interruption request to the CPU 11 or a data transfer start request to the DTC 12. When the processing caused by an interrupt signal is started or when it is completed, an interrupt clear signal (INTCLR) as a signal to clear the interruption is outputted, corresponding to the interrupt signal or the interrupt factor flag of each of the BSC 16, the timer 17, the SCI 18, the analog 19, and the I/O 1A.

The BSC 16 receives a bus request signal from the CPU 11 and the DTC 12, arbitrates the occupancy of the MCU internal bus 1B, and outputs a bus use enabling signal. The BSC 16 interfaces a bus request, a bus acknowledge, a bus command, a wait, an address, data, etc. with the CPU 11 and the DTC 12, and realizes the read/write to the RAM 15 and other functional blocks or modules, coupled to the MCU internal bus 1B. The RAM 15 is comprised of a volatile memory such as an SRAM.

A transmit data output (TXD) and a receive data input (RXD) of the SCI 18 are outputted and inputted via an external SCI and a serial bus of the MCU 10. At this time, the output and the input can be performed via an input/output port if needed.

Figure 1B:
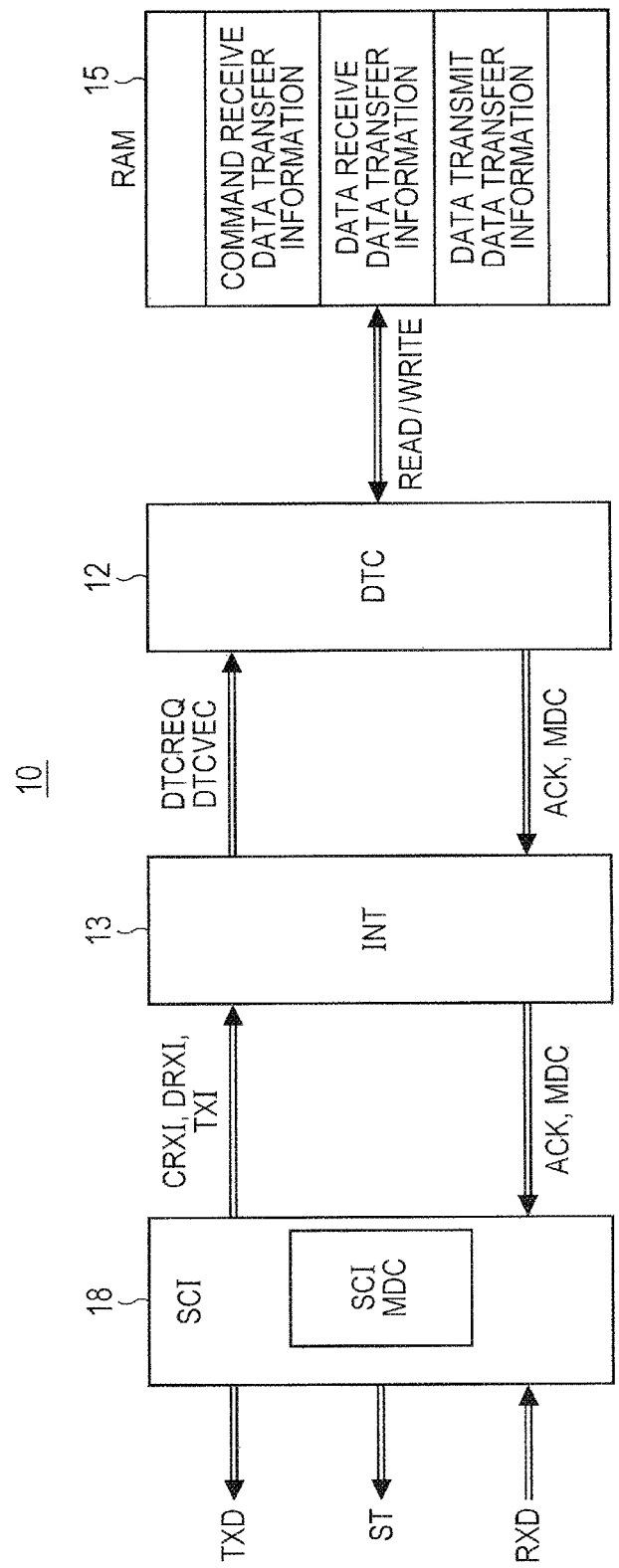
FIG. 1B is a block diagram illustrating a main interface of the microcomputer illustrated in FIG. 1A.

FIG. 1B is a block diagram illustrating the main interface of the microcomputer illustrated in FIG. 1A. The SCI 18 activates the DTC 12 by use of a DTC activation request (DTCREQ) via the INT 13. A data transfer start factor of the SCI 18 includes a command receive completion (command receive data full) interruption request (CRXI), a data receive completion (receive data full) interruption request (DRX), and a data transmit completion (transmit data empty) interruption request (TXI).

The DTC 12 reads, from the RAM 15, data transfer information corresponding to a DTC vector number (DTCVEC) indicated by the INT 13, and performs data transfer. The data transfer information corresponding to the data transfer start factor is provided. As described later, by means of the data transfer corresponding to the command receive completion, the data transfer information to be used in the receive data full (receive data transfer) and the transmit data empty (transmit data transfer) is switched. The DTC 12 activates an acknowledge signal (ACK) at the time of the data transfer and outputs a mode control signal (MDC) according to the data transfer information or the transferred data. The acknowledge signal (ACK) and the mode control signal (MDC) are supplied to the SCI 18 via the INT 13, and based on this, the mode controller (SCIMDC) of the SCI 18 performs the mode change to be described later, SCIMDC corresponding to MDCC in FIG. 13. The SCI 18 outputs a status (ST) according to the mode and the state of transmit and receive.

When the start factor of the data transfer device is decided uniquely, the SCI 18 and the data transfer device may be coupled directly. This can be understood to have unified the DTC 12 and the INT 13 as the data transfer device.

(SCI)

Figure 2:
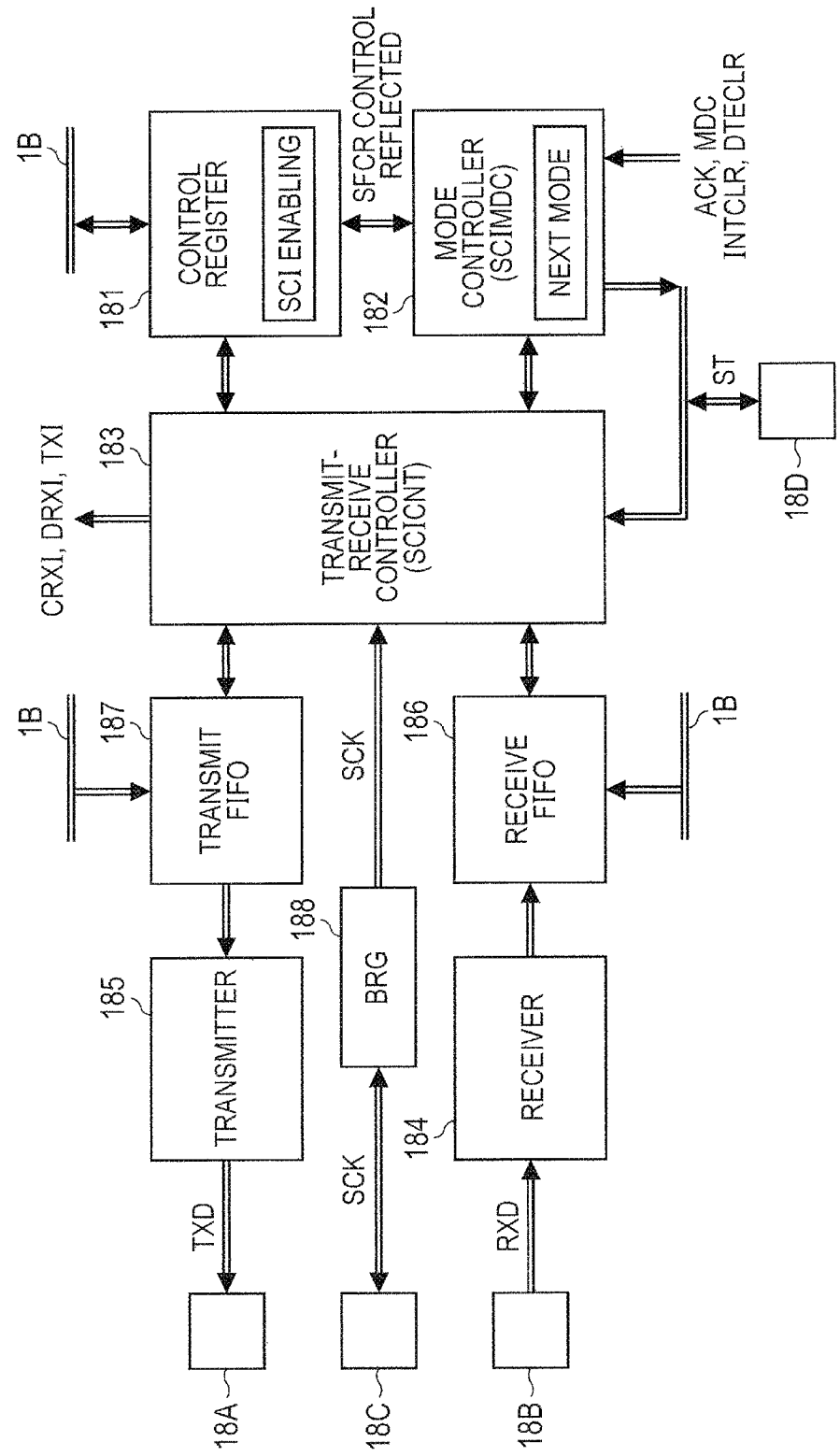
FIG. 2 is a block diagram illustrating a configuration of an SCI illustrated in FIG. 1A.

FIG. 2 is a block diagram illustrating a configuration of the SCI illustrated in FIG. 1A. The SCI 18 includes a control register 181 which corresponds REGISTER in FIG. 13, a mode controller (SCIMDC) 182 which corresponds MDCC in FIG. 13, a transmit-receive controller (SCICNT) 183, a receiver 184, a transmitter 185, a receive FIFO 186, and a transmit FIFO 187.

The control register 181 includes a mode register (SMR), a control register (SCR), a status register (SSR), and a function control register (SFCR), in order to specify the system and format of the transmit and receive and to display the state of an interruption request. For example, corresponding to the state where either a transmit enable (TE) bit or a receive enable (RE) bit of the SCR is set to 1, an operation enabled state (SCI enable) of the SCI 18 is specified. This operation enabled state is specified after the system and format of another transmit and receive are specified. In other words, the system and format of the transmit and receive are not changed in the operation enabled state.

The SCIMDC 182 performs mode controls, such as discrimination of a command and data (CMD), a transmit determent (TD), and a receive determent (RD), based on a setup of the SFCR of the control register 181. The SCIMDC 182 also changes the mode in response to the mode control signal (MDC) of the DTC 12. At this time the SCIMDC 182 once holds the mode control signal (MDC) as the following mode in the SCIMDC 182, and reflects it to the SFCR when the transmit and receive under execution is completed. When the SCI 18 is on the slave side, a status (ST) is outputted from the I/O port (terminal 18D), corresponding to the mode. The status (ST) output is set to a busy state by the receive operation in the state where the command receive is specified. The status (ST) output is set to a ready state when the mode is changed by the operation of the data transfer device due to the command receive completion. The status (ST) output is set to a busy state by the data transmit operation or the data receive operation, and is set to a ready state when the mode is changed (the mode is changed to the command receive) by the operation of the data transfer device due to the above operations.

Based on the control register 181 and the SCIMDC 182, the SCICNT 183 performs a transmit operation, a receive operation, or a transmit-receive operation, in synchronization with a synchronous clock (SCK) supplied from a baud rate generator (BRG) 188 in a clock part. When the SCI 18 is on a master side, the status (ST) is inputted from an I/O port (a terminal 18D). In the case of a busy state, a new transmit-receive operation is prevented from starting.

In the transmit operation, when the synchronous clock (SCK) is inputted in the state where effective data exists in the transmit FIFO 187, the transmit data (TXD) is outputted to an output terminal 18A via the transmitter 185. When the synchronous clock (SCK) is inputted in the state where no effective data exists in the transmit FIFO 187, a transmit overrun error occurs.

In the receive operation, the receive data (RXD) is inputted from an input terminal 18B to the receiver 184, in synchronization with the synchronous clock (SCK). When a unit of data is inputted, the data is transferred to the receive FIFO 186. When receive data is further inputted in the state where the receive FIFO 186 is full, a receive overrun error occurs.

The SCICNT 183 requests the INT 13 for interruption when a transmit overrun error or a receive overrun error occurs. According to this interruption processing routine, the CPU 11 performs necessary processing and the SCI 18 resumes operation.

The SCICNT 183 issues a transmit data empty interruption request (TXI) when a prescribed amount of the empty space occurs in the transmit FIFO 187, and issues a receive data full interruption request (DRXI) when a prescribed amount of data is stored in the receive FIFO 186. The prescribed amount can be specified by the setup of the control register 181.

In the operation enabled state in which both the TE bit and the RE bit are set to 1 in the control register 181, the transmit operation and the receive operation are performed simultaneously because the synchronous clock (SCK) is common to the transmit and the receive. This operation enabled state is called a simultaneous transmit-receive operation enabled state. Even in the simultaneous transmit-receive operation enabled state, when a transmit overrun error or a receive overrun error occurs, the transmit-receive operation is not performed.

In the case of command receive (CMD=1) in the simultaneous transmit-receive operation enabled state, even if there is no effective data in the transmit FIFO 187, the SCICNT 183 does not generate a transmit overrun error and performs a transmit operation, and even if there is effective data in the transmit FIFO 187, the SCICNT 183 performs a transmit operation, retaining the transmit FIFO 187. In the present transmit operation, the transmit output is fixed to 0 or 1. This is the same operation as in the case where the TE bit is set to 0. The SCICNT 183 generates a command receive completion interruption request (CRXI) when a unit of data is received.

Also in the simultaneous transmit-receive operation enabled state, the operation in the case of transmit determent (TD=1) is the same as in the case of the command receive.

Also in the simultaneous transmit-receive operation enabled state, in the case of receive determent (RD=1), the SCICNT 183 disregards receive data and retains the receive FIFO 186. Therefore, a receive data full and a receive overrun error are not generated. This operation is the same as in the case where the RE bit is set to 0.

The receiver 184 is coupled to the input terminal 18B, and stores receive data (RXD) on a bit-by-bit basis. When the receive of the prescribed amount of data (for example, 8 bits) is completed, the data is transferred to the receive FIFO 186. When the RD bit to be described later is set to 1, it is not regarded as receive completion. The contents of the receive FIFO 186 can be read from the CPU 11 or the DTC 12 via the MCU internal bus 1B.

To the transmit FIFO 187, the transmit data is written by the CPU 11 or the DTC 12 via the MCU internal bus 1B. When the TDRE flag to be described later is cleared to 0 and the transmit is started, the contents of the transmit FIFO 187 is transferred to the transmitter 185. The transmitter 185 is coupled to the output terminal 18A, and outputs the transmit data (TXD) on a bit-by-bit basis.

The baud rate generator (BRG) 188 is configured so as to generate the timing used as the basics of the transmit and the receive. The baud rate generator (BRG) 188 is provided with a bit rate register and a bit rate counter.

The SCICNT 183 outputs, as interruption request signals, a TXI (data transmit completion or transmit data empty interruption request) signal, a CRXI (command receive completion or command receive data full interruption request) signal, a DRXI (data receive completion or receive data full interruption request) signal, and an ERI (receive error interruption request) signal. The TXI signal, the CRXI signal, and the DRXI signal can be used as a data transfer request of the DTC 12.

FIG. 3 illustrates the register structure of the SCI illustrated in FIG. 1A. FIG. 3 illustrates only the bits related to the clock synchronous mode. It is also possible to realize a start-stop synchronization mode or other systems, by employing a control bit and a status flag (not shown).

Bits 1 and 0 of the serial mode register (SMR) are clock selection bits (CKS1 and CKS0) to select a clock source of the built-in baud rate generator (BRG) 188.

Bit 7 of the serial control register (SCR) is a transmit interrupt enable (TIE). When the TIE bit is set to 1, the TXI is permitted. Bit 6 is a receive interrupt enable (RIE). When the RIE bit is set to 1, the ERI is permitted. Bit 5 is a transmit enable (TE). When the TE bit is set to 1, the transmit operation is enabled. Bit 4 is a receive enable (RE). When the RE bit is set to 1, the receive operation is enabled. Bit 1 is a clock enable (CKE) to select a clock source and the function of the input/output terminal 18C of the SCK. When the CKE bit is cleared to 0, the internal clock from the baud rate generator (BRG) 188 is used, and the input/output terminal 18C serves as an output terminal of the SCK. When the CKE bit is set to 1, an external clock is used and the input/output terminal 18C serves as an input terminal of the SCK.

According to the system to which the MCU 10 is applied, the operation of the SCI 18 is fixed to one of the transmit operation only (TE=1, RE=0), the receive operation only (TE=0, RE=1), and the simultaneous transmit-receive operation (TE=RE=1). When the transmit and receive control manages the transition of a communicating state, it is necessary to change a register and a bit to refer to, depending on three operations of the transmit operation only, the receive operation only, and the simultaneous transmit-receive operation. In order to prevent producing a mismatch during the communication operation such as the transmit and receive operation, the change of the TE bit and the RE bit during the communication operation is prohibited. After setting the TE bit and the RE bit, it is necessary to wait for time required for synchronization of the basic clock by the baud rate generator (BRG) 188.

Bit 7 of the serial status register (SSR) is a transmit data register empty (TDRE) flag to indicate the empty state of the transmit FIFO 187. The TDRE flag is set to 1 when there is a prescribed empty space. The TDRE flag is cleared to 0 when the CPU 11 writes 0 after reading the state of 1 of the TDRE flag, and when the transmit data is transferred to the transmit FIFO 187 by the DTC 12 activated by the TXI. When the TDRE flag is cleared to 0, the transmit operation starts. Bit 6 is a receive data register full (RDRF) flag to indicate the data state of the receive FIFO 186. The RDRF flag is set to 1 when prescribed data exists in the receive FIFO 186. The RDRF flag is cleared to 0 when the CPU 11 writes 0 after reading the state of 1 of the RDRF flag, and when data is transferred from the receive FIFO 186 by the DTC 12 activated by the CRXI or the DRXI. Bit 5 is an overrun error (ORER) flag to indicate that an overrun error has occurred at the time of receive. Specifically, the ORER flag is set to 1 when the following data is received in the state where the RDRF flag is set to 1. At this time, the receive data register (RDR) holds the receive data before the overrun error occurs, and the data received later is lost. In the state where the ORER flag is set to 1, the subsequent serial transmit and receive is not performed.

When both of the TDRE flag and the TIE bit are set to 1, the TXI occurs. When both of the RDRF flag and the RIE bit are set to 1, the CRXI or the DRXI occurs by a CMD bit to be described later. When both of the ORER flag and the RIE bit are set to 1, the ERI occurs.

Bit 5 of the function control register (SFCR) is a transmit disable (TD). When the TD bit is set to 1 in the state where the transmit-receive operation of the clock synchronous mode is performed and where the clock is inputted, the transmit-receive operation is started according to the clock input, irrespective of the state of the TDRE flag. It is assumed that the transmit data is a fixed value (for example, 00 or FF). By fixing the transmit data to 0 or 1, it is possible to deter a signal change and to avoid undesirable increase of the power consumption. Only the data is fixed and other communication operation is same as the simultaneous transmit-receive operation. Bit 4 is a receive disable (RD). When the RD bit is set to 1, the receive is not regarded as having been completed and the RDRF flag and the ORER flag are not set to 1. Bit 2 is a command receive (CMD) to specify whether the receive completion is regarded as the command receive completion or the data receive completion. That is, when the CMD bit is set to 1, the CRXI occurs as the command receive completion, and when the CMD bit is cleared to 0, the DRXI occurs.

The CMD bit, the TD bit, and the RD bit are changed according to the SCIMDC 182 in response to the mode control signal (MDC) from the DTC 12.

Figure 4:
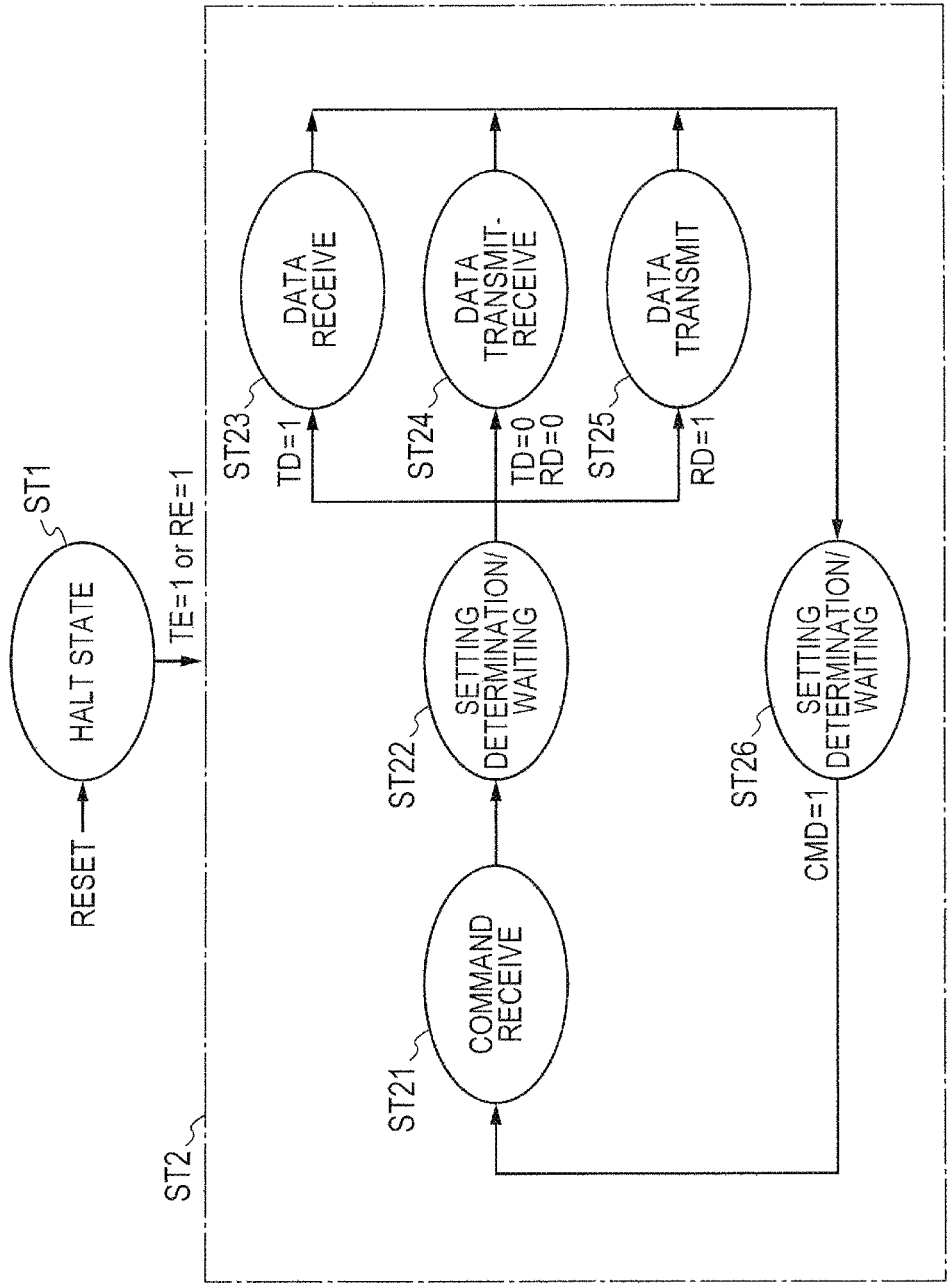
FIG. 4 is a drawing illustrating mode control state transitions of the SCI illustrated in FIG. 1A.

FIG. 4 illustrates the mode control state transition of the SCI illustrated in FIG. 1A. After a reset, the state is a halt state ST1 where the TE bit and the RE bit are set to 0. When the SCR of the control register 181 is set up and at least one of the TE and the RE bit is set to 1 by the CPU 11, the state is set to an operation enabled state ST2. The operation enabled state ST2 is one state of the transmit operation (TE=1), the receive operation (RE=1), and the transmit-receive operation (TE=RE=1).

Although not restricted in particular, first, by the SFCR setup (mode control) performed by the DTC operation, the CMD bit is set to 1 to shift the state to a command receive state ST21. When the command receive is completed, the state is shifted to a setting determination/wait state ST22 to wait for the mode control by the DTC 12.

This mode control makes a transition to one state among the data receive state ST23, the data transmit-receive state ST24, and the data transmit state ST25. When the TD bit is set to 1, the transition is to the data receive state ST23, when the RD bit is set to 1, the transition is to the data transmit state ST25, and when neither the TD bit nor the RD bit is set to 1 (both are cleared to 0), the transition is to the data transmit-receive state ST24. When the data receive, the data transmit and receive, or the data transmit which is required is performed, the state is shifted to a setting determination/wait state ST26 to wait for the mode control by the DTC 12. By the mode control, the CMD bit is set to 1 to make a transition to the command receive state ST21. In the operation enabled state ST2, the system and format of the transmit and receive are not changed.

(INT)

Figure 5:
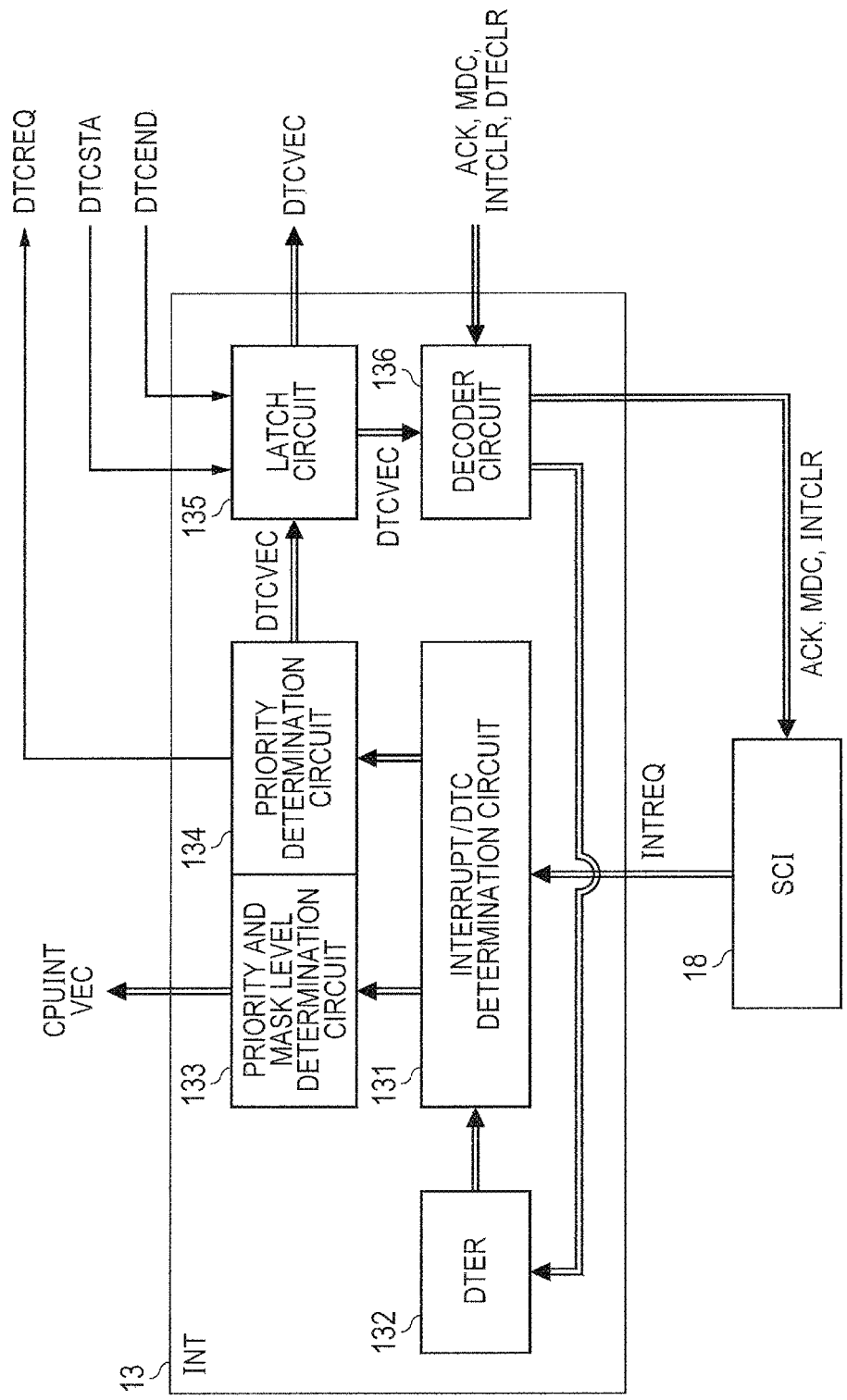
FIG. 5 is a block diagram illustrating a configuration of an interrupt controller illustrated in FIG. 1A.

FIG. 5 is a block diagram illustrating a configuration of the interrupt controller (INT) illustrated in FIG. 1A. There are two kinds of interrupt factors to the MCU 10, an internal interrupt and an external interrupt, and each is provided with an interrupt factor flag. Here, only the internal interrupt factor from the SCI 18 is shown typically.

As is the case with the SCI 18, the interrupt factor flag is set to 1, when the timer 17 and the functional block of the analog 19 change to a prescribed state, or when the external interrupt input terminal of the MCU 10 changes to a prescribed state. When the interrupt factor flag is set to 1 and the corresponding interrupt enable bit is set to 1, an interruption request is made to the INT 13.

This interruption request (INTREQ) is inputted to the interrupt/DTC determination circuit 131. The contents of the DTC enabling register (DTER) 132 are also inputted to the interrupt/DTC determination circuit 131. When the interruption is requested, the interrupt/DTC determination circuit 131 selects whether to activate the DTC 12 or to permit an interruption to the CPU 11. When the DTE bit corresponding to the interrupt factor concerned of the DTC enabling register 132 is set to 1, the interrupt/DTC determination circuit 131 requests the activation to the DTC 12 and does not request the interruption to the CPU 11. When the DTE bit of the DTC enabling register 132 is cleared to 0, the interrupt/DTC determination circuit 131 requests an interruption to the CPU 11 and does not request the activation to the DTC 12.

The interrupt/DTC determination circuit 131 outputs to the priority and mask level determination circuit 133 the interruption request to the CPU 11, and to the priority determination circuit 134 the activation request to the DTC 12, respectively and independently. The priority and mask level determination circuit 133 of the CPU is controlled according to a priority register, an interrupt mask level, etc.

When plural interruption requests have occurred in the interruption request to the CPU 11 and the activation request to the DTC 12, the priority and mask level determination circuit 133 and the priority determination circuit 134 determine the priority, respectively. As a result of this determination, the highest priority is selected and a vector number is generated. The priority and mask level determination circuit 133 outputs a CPU interruption request (CPUINT) and a vector number (VEC), and the priority determination circuit 134 outputs a DTC activation request (DTCREQ) and a DTC vector number (DTCVEC).

The DTC activation request (DTCREQ) is inputted into the DTC 12, and the DTC vector number (DTCVEC) is inputted into the latch circuit 135. A DTC operation start signal (DTCSTA) and a DTC operation end signal (DTCEND) are outputted from the DTC 12, and they are inputted into the latch circuit 135. That is, when the DTC 12 starts operation, the DTC operation start signal (DTCSTA) becomes in an active state and the latch circuit 135 latches and holds the DTC vector number (DTCVEC). When the data transfer of the DTC 12 is completed, the DTC operation end signal (DTCEND) becomes in an active state and the latch of the latch circuit 135 is released.

The DTC vector number (DTCVEC) and the DTC operation end signal (DTCEND) are inputted into the decoder circuit 136, an interrupt factor clear signal (INTCLR) or a DTE clear signal (DTECLR) from the DTC 12 becomes in an active state to the corresponding interrupt factor flag (for example, the TDRE, the RDRF, and the ORER of the SCI 18), and the interrupt factor flag or the DTE bit is cleared.

When activating the DTC 12 by a necessary interrupt factor, the CPU 11 writes in advance the data transfer information to the necessary address of the RAM 15, and sets to 1 the interrupt enable bit of the interruption concerned (for example, the TIE and the RIE of the SCI 18) and the DTE bit corresponding to the interrupt factor concerned of the DTC enabling register 132.

When the interrupt factor flag concerned is set to 1 in this state, the DTC 12 is activated. In the state where the DTC 12 is executing the operations such as the prescribed data transfer, the DTC 12 clears the interrupt factor flag concerned to 0 for every data transfer by the interrupt factor clear signal (INTCLR). At this time, no interruption is requested to the CPU 11.

When the prescribed data transfer is completed, the DTC 12 clears the DTE bit to 0 at the end of the operation, by use of the DTE clear signal (DTECLR). At this time, the interrupt factor flag concerned is held at 1 and the DTE bit is cleared to 0. Therefore, an interruption is requested to the CPU 11. The CPU 11 executes processing corresponding to the end of the prescribed data transfer, etc., and resets the data transfer information or the DTE bit.

(DTC)

FIG. 6 illustrates the data transfer information (transfer information set) of the DTC illustrated in FIG. 1A. The data transfer information of the DTC 12 includes a mode register (MR), a data register (DR), a first and a second source (transfer source) address register (SAR1, SAR2), a destination (transfer destination) address register (DAR), and a transfer count register (CR).

The necessary one of these registers is used according to the contents held in the MR. The CR is split into a block transfer count register (BTCR) and a transfer count register (TCR). The TCR is split to the higher-order 8 bits (TCRH) and the lower-order 8 bits (TCRL). It operates according to the data transfer mode to be described later. As for these registers (MR, CR), a circuit of one group exists in the DTC 12, and although not restricted in particular, they do not exist in the address space of the CPU 11. The necessary number of groups of the data transfer information to be stored in these registers are arranged in a prescribed data transfer information address area of the RAM 15 for example, on the address space of the CPU 11.

The bit configuration of the mode register (MR) is as follows. Bits 31-16 specify the setup of the data transfer mode and the input data for table reference. Bits 15-0 specify the table reference of the data transfer function for the table reference and also specify the data transfer of the ordinary data transfer function.

Bit 31 is a TLU bit to select the ordinary data transfer or the data transfer function for the table reference. When the TLU bit is cleared to 0, the ordinary data transfer is performed. The data transfer information is the MR, the SAR2, the DAR, and the CR (32 bits×4 pieces). In the explanation of the ordinary data transfer, the SAR2 as hardware is described as the SAR as the data transfer information. When the TLU bit is set to 1, the table reference mode is performed.

Bit 30 is a BRM bit, and becomes effective when the TLU bit is set to 1 to specify a branch mode. The data transfer information is the MR, the SAR1, the SAR2, and the DAR (32 bits×4 pieces). The CR is regarded as 0. Based on the data read from the address specified by the SAR1, the DTC 12 refers to a table specified by the SAR2. The DTC 12 writes the data read from the table to the destination address specified by the DAR.

Bit 27 is a MDCE bit. The DTC 12 performs data transfer of CR=0 in the state where the MDCE bit is set to 1, and outputs the mode control signal (MDC).

Bits 26-24 are MDC[2:0] bits. In the state where the TLU bit is cleared to 0 and the MDCE bit is set to 1, the mode control signal (MDC) is specified at the time of the data transfer of CR=0. In this case, the MDC[2] bit is reflected to a CMD bit, the MDC[1] bit is reflected to the TD bit, and the MDC[0] bit is reflected to the RD bit. In the state where both of the TLU bit and the MDCE bit are set to 1, the DTC 12 outputs a mode control signal (MDC), based on the data read from the table specified by the SAR2.

Bits 22-20 are SF[2:0] bits, and specify the left shift of the input data by 8-0 bits.

Bits 17 and 16 are ISz[1:0] bits to select a byte size, a word size, or a long-word size to be employed in reading the input data.

Bits 15 and 14 are an SM1 bit and an SM0 bit to specify whether the SAR is incremented, decremented, or not changed after the data transfer.

Bits 13 and 12 are a DM1 bit and a DM0 bit to specify whether the DAR is incremented, decremented, or not changed after the data transfer, Bits 11 and 10 are a TMD1 bit and a TMD0 bit to select the data transfer mode. When the TMD1 bit and the TMD0 are set to 00, the normal mode is selected. In this normal mode, one activation performs one data transfer from the address indicated by the SAR to the address indicated by the DAR. Subsequently, the operation of the SAR and the DAR is performed based on the specification of the SM1 bit, the SM0 bit, the DM1 bit, and the DM0 bit, and the CR is decremented. This operation is repeated the number of times specified by the CR, whenever the start factor occurs. Then, when the data transfer is completed the number of times specified by the CR, the DTC operation is prohibited and the interruption used as the start factor is requested to the CPU 11. When the TMD1 bit and the TMD0 bit are set to 01, the repeat mode is selected. When the TMD1 bit and TMD0 bit are set to 10, the block transfer mode is selected. The repeat mode and the block transfer mode can be realized by employing the well-known technology.

Bit 9 is a DIR bit to select which of the transfer source or the transfer destination, as a repeat area and a block area.

Bits 7 and 6 are an Sz1 bit and an Sz0 bit to select a byte size, a word size, or a long-word size to be employed in performing one data transfer.

Bit 2 is a CRE bit. When the CRE bit is cleared to 0, responding to the DTC activation request (DTCREQ), the DTC 12 is operated without limitation. In the case of the normal mode, the CR is not used. When the CRE bit is set to 1, the DTC 12 is operated according to the value initially set to the CR.

Bit 1 is an NXTE1 bit to select whether the data transfer is terminated or the next data transfer is performed, to one start factor. When the NXTE1 bit is cleared to 0, after reading the data transfer information and transferring the data, the data transfer information is written and the operation of the DTC is terminated. When the NXTE1 bit is set to 1, after reading the data transfer information and transferring the data, the data transfer information is written. Furthermore the data transfer information is read from the consecutive address, the data transfer specified by the present data transfer information is performed, and the data transfer information is written. This operation is called a chain transfer. Bit 0 is an NXTE0 bit to specify whether the chain transfer is performed when the CR becomes 0.

Figure 7:
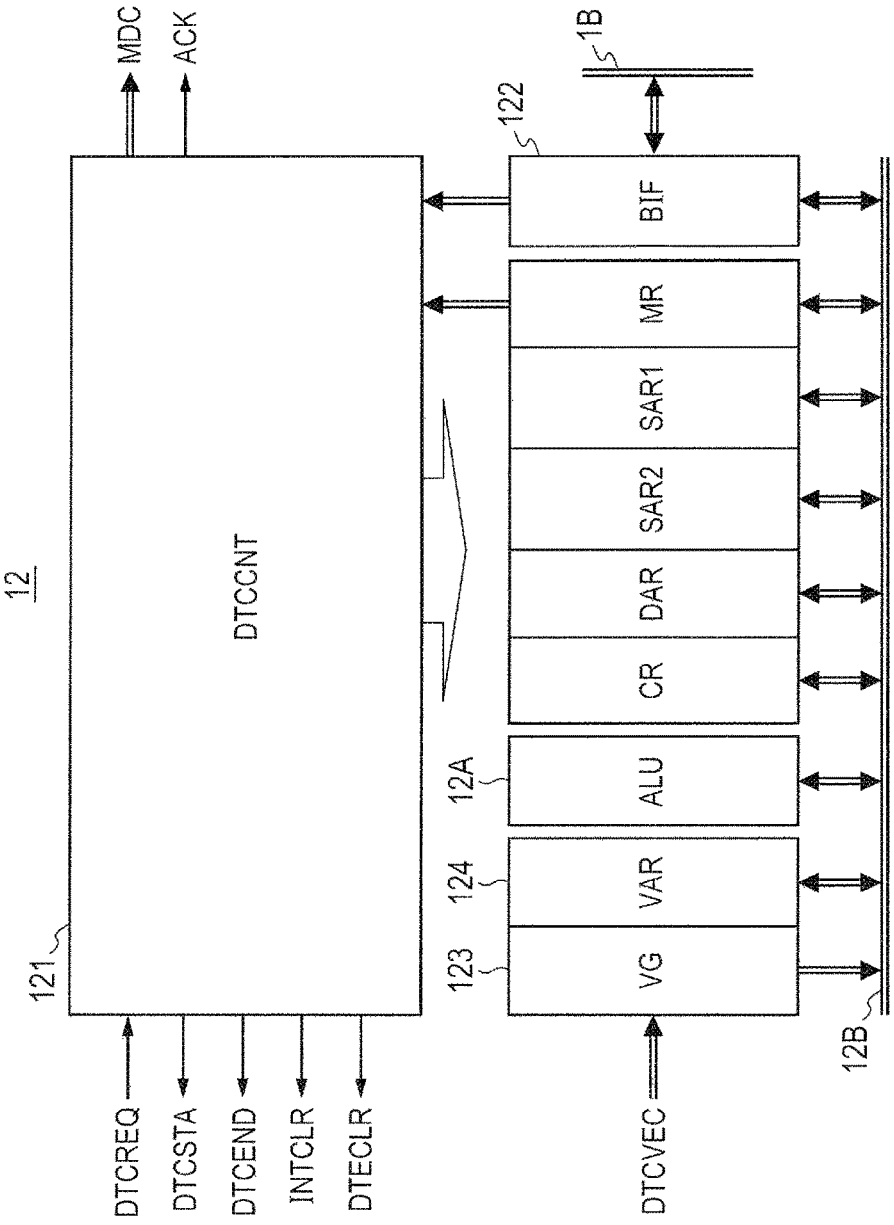
FIG. 7 is a block diagram illustrating a configuration of the DTC illustrated in FIG. 1A.

FIG. 7 is a block diagram illustrating a configuration of the DTC illustrated in FIG. 1A. The DTC 12 includes a data transfer control block (DTCCNT) 121, a bus interface (BIF) 122, a vector generation block (VG) 123, a vector address register (VAR) 124, and an arithmetic logic unit (ALU) 12A. The DTC 12 further includes a mode register (MR), a first source address register (SAR1), a second source address register (SAR2), a destination address register (DAR), and a data transfer counter (CR).

The DTCCNT 121 controls the DTC 12, based on the DTC activation request (DTCREQ) from the INT 13 and the contents of the MR.

The BIF 122 interfaces the DTC internal bus 12B with the MCU internal bus 1B. This interface includes a bus request, a bus acknowledge, a bus command, a wait, an address, and data. The BIF 122 is used also for confirming transferred data by the data transfer control block (DTCCNT) 121.

The VG 123 generates a vector address according to the interrupt DTC vector number (DTCVEC) supplied from the INT 13. For example, the VG 123 quadruples the DTCVEC and adds a prescribed offset to it.

The VAR 124 stores a leading address of the data transfer information read from the region of the RAM 15 which is indicated by the vector address generated by the VG 123.

The MR, the SAR1, the SAR2, the DAR, and the CR store the data transfer information read sequentially from the region of the RAM 15 which is indicated by the leading address of the data transfer information stored in the VAR 124.

The ALU 12A has functions such as logical operation, shift, and arithmetic operation, and executes two or more of these operations in the given order.

Although not shown, the DTC internal bus 12B has multiple buses, enabling the contents of the SAR1, the SAR2, the DAR, and the CR to be supplied to the ALU 12A for arithmetic. According to the configuration, the arithmetic in the repeat mode or the block transfer mode is performed. The contents of the data transfer operation in the repeat mode and the block transfer mode can be realized by employing the well-known technology. Therefore, the detailed explanation thereof is omitted.

When a DTC activation request signal (DTCREQ) is supplied from the INT 13, the DTC 12 starts operation. When the DTC 12 starts operation, the DTCCNT 121 sets the DTC operation start signal (DTCSTA) to an active state. The DTCCNT 121 activates an acknowledge signal (ACK) in synchronization with this bus cycle when performing the data transfer. When the transfer counter (CR) is 0 and according to the setup of the MR, the DTCCNT 121 changes the mode control signal (MDC) to a prescribed state and sets up an SFCR of the SCI 18. The DTCCNT 121 activates the interrupt factor clear signal (INTCLR) or the DTE clear signal (DTECLR), clears the interrupt factor flag or the DTE bit used as the start factor, and terminates operation. After the DTC 12 terminates operation, the DTCCNT 121 activates the DTC operation end signal (DTCEND) and returns to the halt state.

Application

Figure 8A:
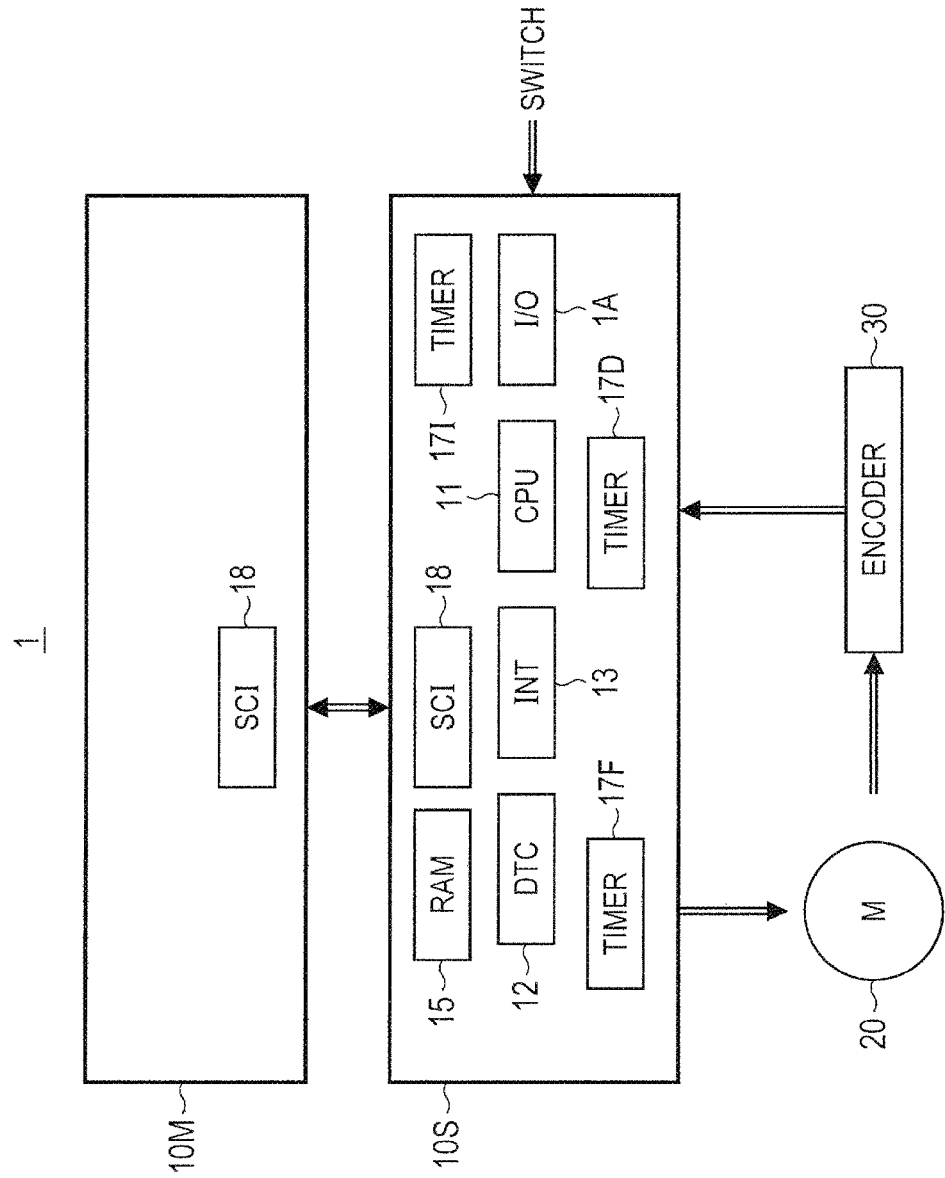
FIG. 8A is a block diagram illustrating a configuration of a microcomputer system according to an application.
Figure 8B:
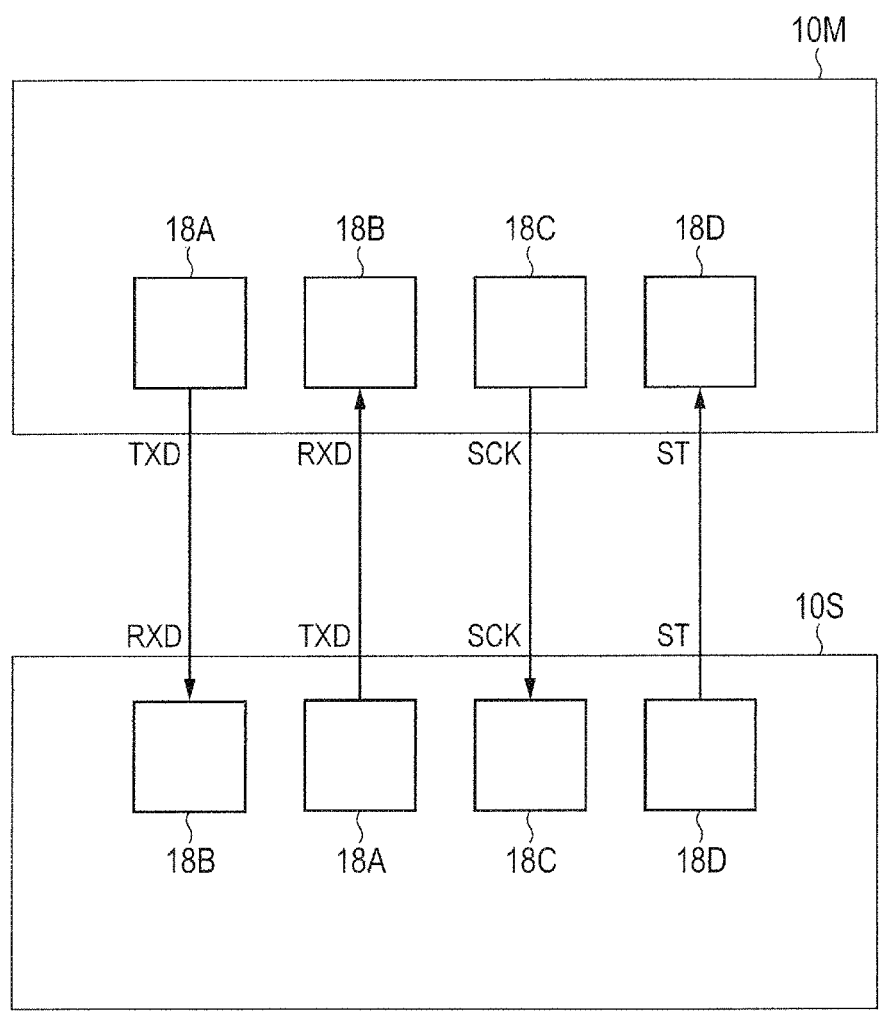
FIG. 8B is a block diagram illustrating connection relation of the microcomputer system illustrated in FIG. 8A.

FIG. 8A is a block diagram illustrating a configuration of a microcomputer system according to an application. FIG. 8B is a block diagram illustrating connection relation of the microcomputer system illustrated in FIG. 8A. The microcomputer system 1 includes a master MCU 10M, a slave MCU 10S, a motor 20, and an encoder 30 to detect the position of the motor 20. The microcomputer system 1 is a camera system for example, and the master MCU 10M is a camera body MCU and the slave MCU 10S is a camera lens MCU.

The MCU 10 according to the implementation example is applied to the master MCU 10M and the slave MCU 10S. The slave MCU 10S uses a timer 17F for the drive of a focal motor (M) 20, a timer 17D for the input of the encoder (ENCODER) for detecting the position of the focal motor 20, and a timer 17I with interval timer function. A switch (SWITCH) of various kinds of setup is inputted via the input/output port (I/O) 1A.

As illustrated in FIG. 8B, the SCI 18 of the master MCU 10M and the SCI 18 of the slave MCU 10S interface with each other with three signal lines of the clock synchronous mode and one signal line of an input/output port indicating the status. A terminal 18A to output the TXD, a terminal 18B to input the RXD, a terminal 18C to output the SCK, and a terminal 18D to input the ST of the master MCU 10M are respectively coupled to a terminal 18B to input the RXD, a terminal 18A to output the TXD, a terminal 18C to input the SCK, and a terminal 18D to output the ST of the slave MCU 10S. The master MCU 10M outputs the synchronous clock (SCK), and the slave MCU 10S outputs the status (ST).

(A First Example of the Communication Operation)

Figure 9:
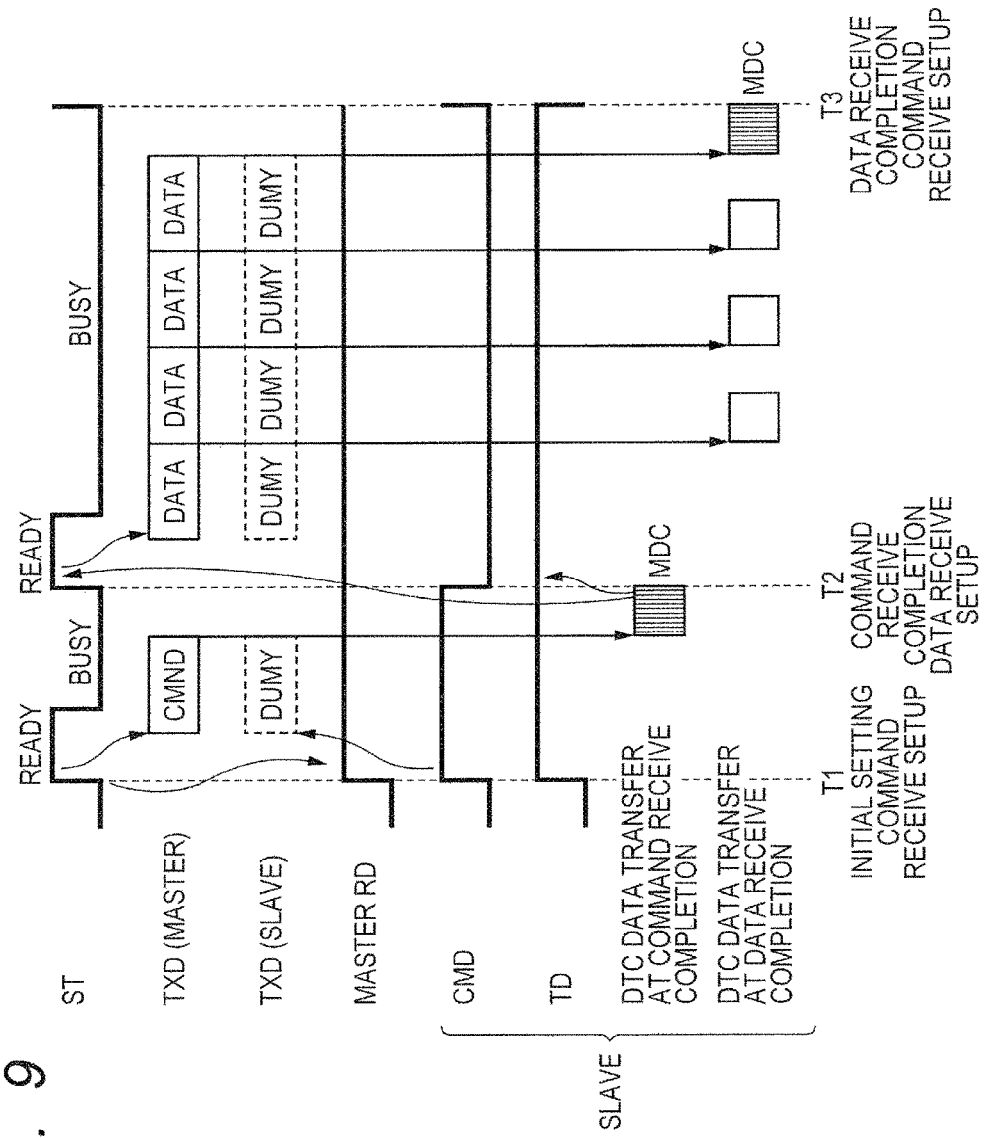
FIG. 9 is a timing chart illustrating a first example of the communication operation in the microcomputer system illustrated in FIG. 8A.

FIG. 9 is a timing chart illustrating a first example of the communication operation in the microcomputer system illustrated in FIG. 8A. The first example of the communication operation is a case of master transmit/slave receive. In FIG. 9, a shading part illustrates the operation of the DTC 12 which performs the mode control of the SCI 18 of the slave MCU 10S.

First, the master MCU 10M and the slave MCU 10S perform initial setting to a register of the respective SCI 18 as a transmit-receive operation (TE=1, RE=1) (timing T1).

The master MCU 10M inputs the status (ST) output of the slave MCU 10S. When the status (ST) is in a busy (BUSY) state, the transmit is put on standby. When the transmit data (command) is set up and the status (ST) input becomes a ready (READY) state, the master MCU 10M transmits the command (CMND). At this time, the master MCU 10M sets the RD bit to 1 to disregard the receive data.

The slave MCU 10S sets the CMD bit to 1 and the TD bit to 1, to set to the command receive (timing T1). Setting of the transmit data empty interruption request (TXI) is deterred, data setting to the transmit FIFO 187 is not performed, the transmit data (TXD) is fixed to a high level, for example, and dummy (DUMY) data is outputted. When the receive starts, the status (ST) output is set to a busy state. When the receive of a command is completed, the SCI 18 issues a command receive completion interruption request (CRXI), and the INT 13 issues a DTC activation request (DTCREQ) to the DTC 12. The DTC 12 reads the receive data of the command, adds this to the SAR2, and reads the table region of the RAM 15. These contents set up the transmit data empty (transmit data transfer) specified by the DAR and the DTC vector (TXI vector, DRXI vector) of the data transfer start request due to the receive data full (receive data transfer). In the present embodiment, it is assumed that two long words is block-transferred. When one of two long words is prescribed data (for example, when it is 00000000), the mode control signal (MDC) is activated so as to set the corresponding TD bit or RD bit to 1. Specifically, when the DTC vector of the transmit data empty is 00000000, the TD bit is set to 1 to make the transmit determent effective. When the DTC vector of the receive data full is 00000000, the RD bit is set to 1 to make the receive determent effective. The CMD bit is cleared to 0. Following this mode control signal (MDC), the SCI 18 sets up the SFCR, switches to the data receive or the data transmit, and sets the status (ST) output to a busy state. In this case, corresponding to the command described above, there are three modes: master transmit/slave receive, slave transmit/master receive, and master/slave transmit and receive. The present embodiment exemplifies the case of the master transmit/slave receive. Therefore, the master sets the RD bit to 1 to make the receive determent (data transmit) effective, and, the slave sets the TD bit to 1 to make the transmit determent (data receive) effective (timing T2).

In the master MCU 10M, the transmit data is set up after the completion of the command transmit. When the status (ST) input becomes a ready state, a prescribed number of data corresponding to the command is transmitted.

The slave MCU 10S sets the status (ST) output to a busy state at the start of the data receive. Following the completion of the data receive, the slave MCU 10S issues a receive data full (receive data transfer) data transfer start request to activate the DTC 12. The DTC 12 transfers the received data to a prescribed address of the RAM 15. Data of a prescribed number corresponding to the command is set to the CR, and data of the number according to this is transferred. When the CR becomes 0, the mode control signal (MDC) specified by the MR is outputted, and the mode control state of the SCI 18 is shifted (timing T3). According to this, the SCI 18 sets the status (ST) output to a ready state. When the CR completes the data transfer of 0, an interruption request is issued to the CPU 11.

Figure 10:
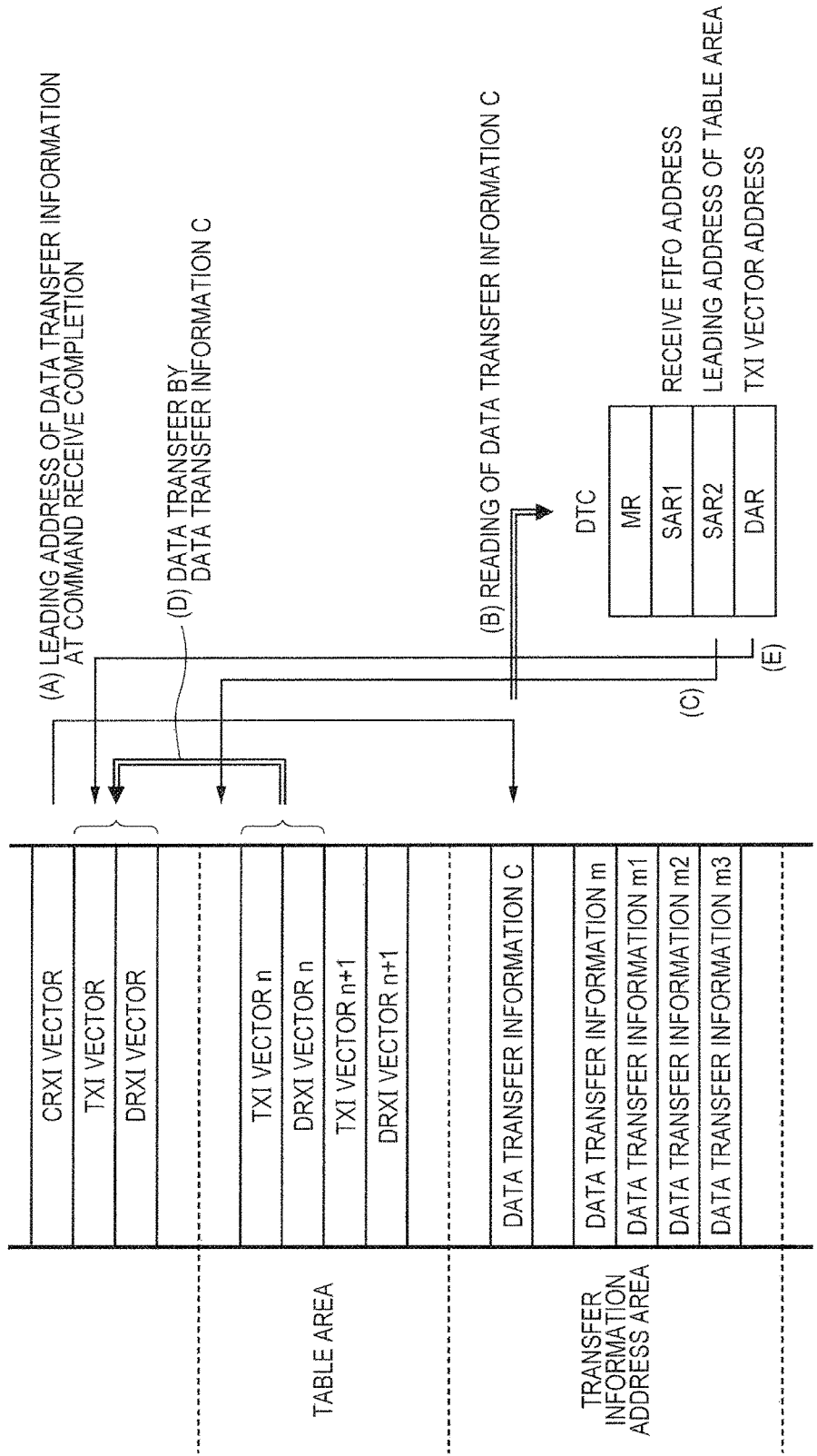
FIG. 10 is a drawing illustrating data transfer for command receive completion in the microcomputer system illustrated in FIG. 8A.

FIG. 10 illustrates the data transfer for the command receive completion in the first example of FIG. 9. In the data transfer for the command receive completion in the slave MCU 10S, the CPU 11 sets up the data transfer information as follows.

In the MR, the TLU bit, the BRM bit, and the MDCE bit are all set to 1. The SF [2:0] bits specify +4. The ISz[1:0] bits specify the byte size corresponding to the command. The SM1 bit and the SM0 bit specify the SAR2 fixation. The DM1 bit and the DM0 bit specify the DAR fixation. The TMD1 bit and the TMD0 bit specify the normal mode. The SAR1 specifies the address of the receive FIFO 186. The SAR2 specifies the leading address of the table region of the DTC vector of the data transmit empty transfer request and the data receive full transfer request. The DAR specifies the DTC vector address of the data transmit empty transfer request and the data receive full transfer request. These items of information are stored as the data transfer information C illustrated in FIG. 10

In FIG. 10, a thin line arrow indicates the specification of an address, and a double line arrow indicates the read/write of data.

(A) When the DTC is activated by the command receive completion, the leading address of the data transfer information is read from the corresponding vector area (the region (CRXI vector) specified by the vector address of the CRXI interruption).

(B) Based on this address, the data transfer information C is read from the data transfer information address area. This data transfer information C is the contents to be stored in the MR, the SAR1, the SAR2, and the DAR. The address of the receive FIFO 186 is stored in the SAR1. The leading address of the table region is stored in the SAR2. The TXI vector address is stored in the DAR.

(C) First, the command of the byte size specified in the ISz bit is read from the receive FIFO 186 specified by the SAR1. The read data is left-shifted by 4 bits as specified in the SF [2:0] bit, by the ALU 12A. This result is added to the SAR2 and used as the source address.

(D) The transferred data is read from the source address of the table region specified by the SAR2. In the present embodiment, the TXI vector n and the DRXI vector n are read.

(E) This is written to the TXI vector area and the DRXI vector area specified by the DAR. Concurrently, the mode control signal (MDC) is outputted as described above. For example, the DRXI vector n is the contents which indicate necessary data transfer information m.

Accordingly, it is possible to select the data transfer information (from the data transfer information m, m1, m2, m3, etc.) corresponding to the command and responding to the TXI and DRXI data transfer.

The command can be specified among 256 kinds at the maximum in the case of the byte size. The command may define the presence or absence of the subsequent data, the data length, and a kind of data. For example, a command directs to write the subsequent data to the timers 17D, 17F, and 17I and the I/O port 1A of the slave MCU 10S, and another command directs to transmit the desired data of the timers 17D, 17F, and 17I, and the I/O port 1A of the slave MCU 10S. Such a command may be defined arbitrarily from the appropriate ones for the microcomputer system 1 concerned.

Figure 11:
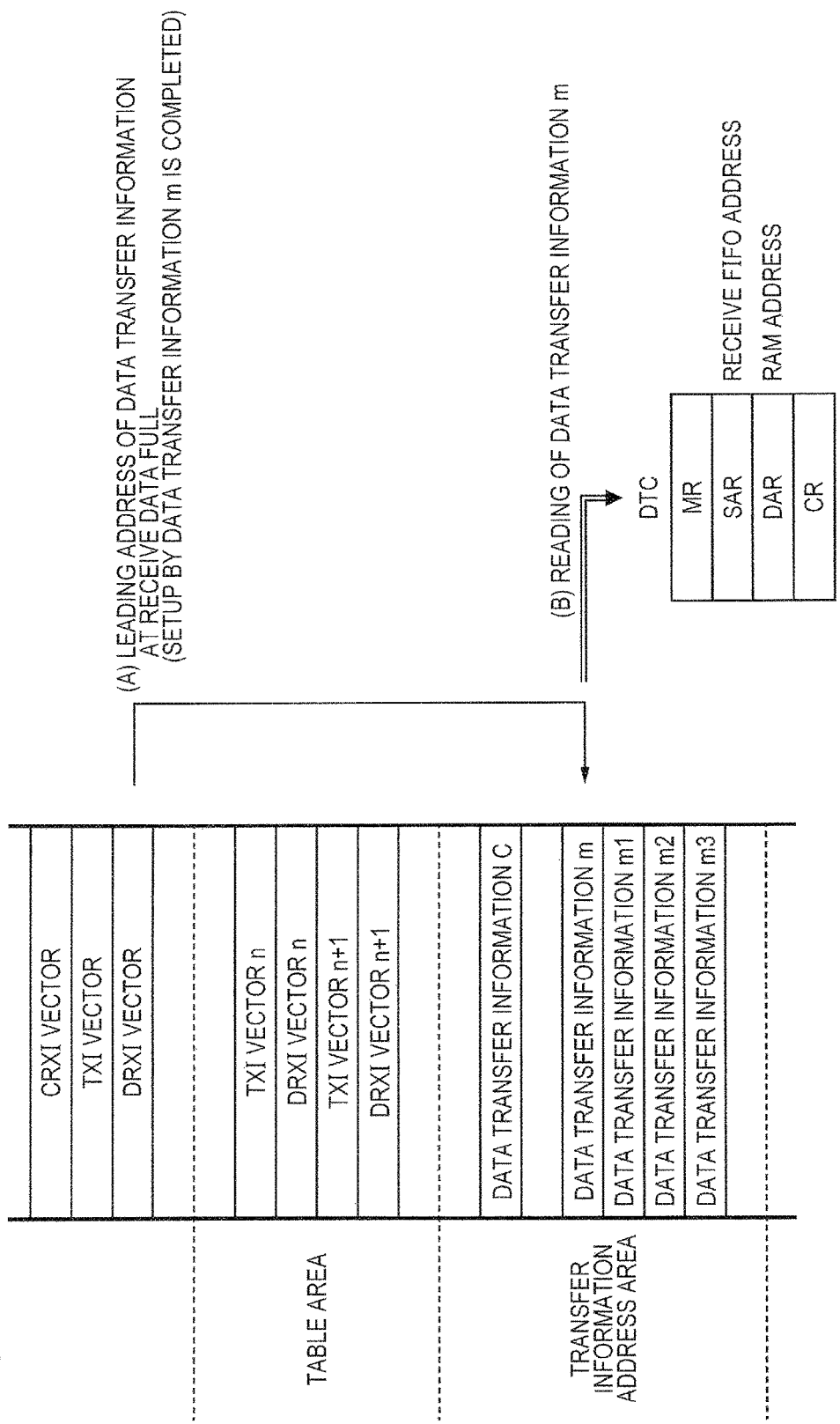
FIG. 11 is a drawing illustrating data transfer for command receive completion in the microcomputer system illustrated in FIG. 8A.

FIG. 11 illustrates data transfer for receive data full (receive data transfer) in the first example of FIG. 9. In the data transfer for the receive data full (receive data transfer) in the slave MCU 10S, the data transfer information is set up as follows.

In the MR, the TLU bit and the BRM bit are cleared to 0, and the MDCE bit is set to 1. The Sz[1:0] bits specify the byte size corresponding to the command. The SM1 bit and the SM0 bit specify the SAR fixation. The DM1 bit and the DM0 bit specify the DAR increment. The TMD1 bit and the TMD0 bit specify the normal mode. The SAR specifies the address of the receive FIFO 186. The DAR specifies the address of the RAM 15 for data receive. The CR specifies the number of data corresponding to the command. These items of information are stored as the data transfer information m illustrated in FIG. 11.

(A) When the DTC 12 is activated by the receive data full (receive data transfer), the leading address of the data transfer information is read from the corresponding vector area (the region (DRXI vector) specified by the vector address of the DRXI interruption). This is updated to the necessary contents by the data transfer due to the command receive completion, and indicates the data transfer information m.

(B) Based on this address, the data transfer information m is read from the data transfer information address area. This data transfer information is the contents of the MR, the SAR, the DAR, and the CR. The address of the receive FIFO 186 is stored in the SAR, and the address of the RAM 15 is stored in the DAR.

(C) First, the receive data of the byte size specified in the Sz bit is read from the receive FIFO 186 specified by the SAR. The receive data read is written in the RAM 15 specified by the DAR. This operation is repeated the number of times specified by the CR. When the CR becomes 0, the mode control signal (MDC) is outputted as described above.

(A Second Example of the Communication Operation)

Figure 12:
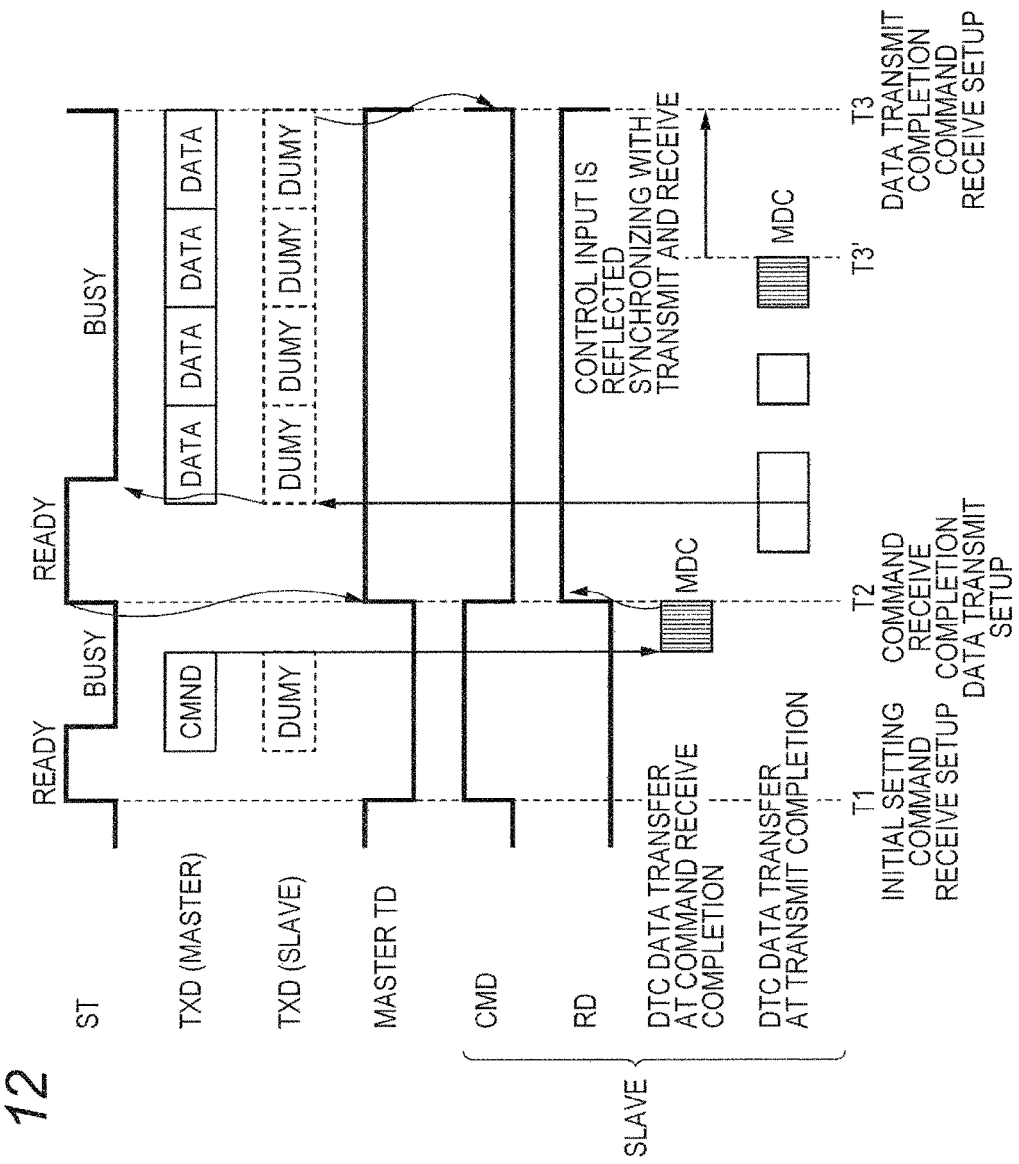
FIG. 12 is a timing chart illustrating a second example of the communication operation in the microcomputer system illustrated in FIG. 8A.

FIG. 12 is a timing chart illustrating a second example of the communication operation in the microcomputer system illustrated in FIG. 8A. In the second example of the communication operation, the data transfer corresponding to a command is the slave transmit/master receive. As is the case with the first example described above, the master MCU 10M and the slave MCU 10S perform respectively the initial setting as the transmit-receive operation, and perform the transmit and receive of the command.

In order to output the synchronous clock corresponding to the number of the necessary data, the master MCU 10M sets the TD bit to 1, and transmits dummy data by fixing the transmit data to a high level, for example.

By the mode control of the DTC 12 at the time of the command receive completion, the slave MCU 10S sets the RD bit to 1 to make the data transmit effective (timing T2). That is, the DTC vector of the transmit data empty on the table of the RAM 15 is set as a prescribed vector other than 00000000, and the DTC vector of the receive data full is set to 00000000.

In order to transmit a prescribed number of data corresponding to the command, the slave MCU 10S activates the DTC 12S, according to the transmit data empty (transmit data transfer) data transfer request. The DTC 12 transfers the data to be transmitted, from the prescribed address of the RAM 15 to the transmit FIFO 187. The DTC 12 sets the status (ST) output to a busy state at the start of the data transmit. The data transfer of the number indicated by the CR and determined in advance is performed. When the CR becomes 0, the mode control signal (MDC) specified by the MR is outputted, and the mode control state of the SCI 18S is shifted (timing T3'). At this time, change of the mode or change of the SFCR is not reflected immediately, but is reflected after the completion of the output of the transmit data (in the state where data has run out in the transmit FIFO 187 and the transmitter 185) (timing T3). In other words, the reflecting is enabled after the mode control input is synchronized with the transmit and receive. The SCI 18S sets the status (ST) output to a ready state. When the CR completes the data transfer of 0, the SCI 18S requests interruption to the CPU 11.

In the data transfer for the transmit data empty (transmit data transfer), the data transfer information is set up as follows.

In the MR, the TLU bit and the BRM bit are cleared to 0, and the MDCE bit is set to 1. The Sz[1:0] bits specify the byte size corresponding to the command. The SM1 bit and SM0 bit specify the SAR increment. The DM1 bit and the DM0 bit specify the DAR fixation. The TMD1 bit and the TMD0 bit specify the normal mode. The SAR specifies the address of the RAM 15S for the data transmit. The DAR specifies the address of the transmit FIFO 187. The CR specifies the number of data corresponding to the command.

(A Third Example of the Communication Operation)

In the case of the master/slave transmit and receive as the third example of the communication operation, although not shown, the slave MCU 10S clears both of the TD bit and the RD bit to 0, and the DTC 12 does not control the change of the SFCR at the time of the data transfer due to the transmit data completion, but controls the change of the SFCR at the time of the data transfer due to the receive data completion. That is, the DTC vector of the transmit data empty and the DTC vector of the receive data full on the table of the RAM 15 are both set as a prescribed vector other than 00000000.

According to the above implementation example, the following operation-effects are obtained.

(1) By setting the TD bit or the RD bit to 1 in the state where the transmit and the receive are enabled (TE=RE=1) (the simultaneous transmit-receive operation being kept specified), it is possible to deter the operation of the transmit or the receive. In the case of the transmit operation determent, neither preparation of the transmit data nor specification of the transmit start is required, and it becomes possible to perform the transmit and receive operation of arbitrary data, corresponding to the synchronous clock input. In the case of the receive operation determent, the received contents are disregarded, an overrun error is not detected, and neither the interruption request nor the data transfer start request is made. Accordingly, in the operation enabled state of the simultaneous transmit-receive operation and the synchronous clock input, the transmit operation determent and the receive operation determent become possible temporarily, in other words, not requiring the standby time for the setup change. Preparation of useless transmit data and processing of useless receive data are not required; accordingly it is possible to enhance the efficiency of processing. If the TE bit or the RE bit is switched, it is necessary to ensure the consistency with the operation of the whole SCI. As opposed to this, by not changing the basic operation of the simultaneous transmit-receive operation but by restricting the control target of the TD bit and the RD bit, it is possible to simplify the logic. It is possible to reduce the possibility of falling into an undesirable state.

(2) In the receive operation, it is possible to specify whether the operation is to receive a command or to receive data, and these operations can issue respectively an interruption request or a data transfer start request. Accordingly, it becomes possible to generate the start factor of the data transfer device in a dedicated manner. At the time of the command receive operation, no preparation is required for the transmit data by specifying the transmit operation determent. At the time of the data receive operation, it is possible to specify the transmit operation determent. Owing to the separation of the interruption request of the command receive completion and the interruption request of the data receive completion, it is possible to execute the processing immediately, without determining which interruption request it is. It is possible to efficiently select the suitable processing method, such that the data transfer by the data transfer device is performed in response to the interruption request of the command receive completion, and that the interruption processing by the CPU is performed in response to the interruption request of the data receive completion.

(3) The mode is switched according to the operation of the data transfer device, responding to the start factor and the mode such as the command receive, the data receive only, and the data transmit only. For example, the mode is switched to the command receive at the time of completion of the data transfer by the data transfer device responding to the data transmit or the data receive.

(4) It is possible to output the status corresponding to the mode. By the receive operation in the state where the command receive is specified, the status output to the outside is set to the second state (busy state). When the mode is changed by the operation of the data transfer device responding to the command receive completion, the status output to the outside is set to the first state (ready state). When the status output is set to the second state (busy state) by the data transmit operation or the data receive operation and when the mode is switched (to the command receive) by the above-described operation of the data transfer device, the status output is set to the first state (ready).

Accordingly, it is possible to realize the mode corresponding to the actual communications processing, and it is possible to reduce the setup change and the standby time. By activating the data transfer device according to the mode and the communication operation, and by switching the mode by the control of the data transfer device, the processing of the CPU becomes unnecessary and increase in efficiency and speeding up can be realized. By enabling the data transfer device to perform, instead of the CPU, the mode control of the SCI, the judgment of the command, and the data transfer, it is possible to reduce the frequency of issuing an interruption request to the CPU and possible to lengthen the period in which the CPU operates in a low power consumption state. It is possible to eliminate the exceptional treatment, evacuation/return operation of a stack, and the execution of the return instruction, which the CPU should execute in the interruption processing, thereby contributing to the simplification of the program or the increase in efficiency of the system. It is also possible to shorten the time from the occurrence of an event to the execution of necessary operation, and to enhance the so-called responsiveness. By the operation of the data transfer device which has a smaller logic scale than the CPU and can perform high-speed processing, and by making the CPU operate in a low power consumption state, it is possible to realize low power consumption. It is also possible to enhance the development efficiency of software.

It is possible to flexibly support the command and communications system which are appropriate for each of the microcomputer systems. When expressing in other words, it is possible to change the mode of the transmit and receive of a microcomputer depending on the data supplied to the microcomputer.

As described above, the invention accomplished by the present inventors has been concretely explained based on the embodiments, the implementation examples, and the applications. However, it cannot be overemphasized that the present invention is not restricted to the embodiments, the implementation examples, and the applications as described above and it can be changed variously.

The present implementation example adopts the specification in which the TE bit and the RE bit are used as permission of the operation after the completion of the setting of the SCI, and the TD bit and the RD bit are provided independently. However, it is preferable that the operation enabling bit of the SCI is provided common to the transmit and the receive, and that the function of the TE bit and RE bit and the function of the TD bit and RD bit are combined, thereby enabling a change during the operation. Although the transmit output in the case of the command receive and the transmit determent may be arbitrary, it is desirable to fix it to 0 or 1. When the CMD bit is set to 1, it is also preferable to set the transmit determent irrespective of the TD bit. It is also preferable not to adopt a common RDRF flag as the interrupt factor flag of the CRXI and the DRXI but to adopt an independent interrupt factor flag. It is further preferable to clear the RIE bit or the RDRF flag to 0 when the RD bit is set to 1. The long word data for specifying the TD bit and the RD bit may be data which is not used as the data transfer information storing area. The present implementation example adopts 00000000, which is common with the reset vector of the CPU. This is based on the assumption that it is not used as the data transfer information storing area. When the data transfer storing address is considered to be in the unit of long words, lower-order 2 bits may be used.

The empty space and the amount of data for the receive FIFO and the transmit FIFO to detect the receive data full (receive data transfer) and the transmit data empty (transmit data transfer) may be changed with the use of the control register. It is also preferable that the unit to determine the receive completion in the command receive is made selectable from other than the byte size. According to the data transfer due to the command receive completion, the data transfer information may be rewritten as well as the vector area. It is preferable that the CPU can set the CMD bit, the TD bit, and the RD bit. It is also preferable to make the CPU process an arbitrary command so as to set the CMD bit, the TD bit, and the RD bit.

The present implementation example explains the SCI as an example; however, the present invention is not restricted to this, and is applicable to serial communication interfaces, such as an I2C (Inter-Integrated Circuit) and an SPI (Serial Peripheral Interface). The present implementation example explains the DTC as an example; however, the present invention is not restricted to this, and is also applicable to, for example, a DMAC (Direct Memory Access Controller) which transfers data between a memory and a register. It is also possible to change variously the concrete configurations of the DTC and the interrupt controller. The explanation of a BSC and the details of the bus operations such as bus right and wait are omitted; however they can be implemented properly. The present invention may be applied only to one of the master MCU and the slave MCU. In this case, the application to the slave MCU is more preferable.

The configuration of the microcomputer is not restricted. The functional blocks and others can be changed. The above explanation is made about the case where the present example is applied to the microcomputer; however, the present invention is not restricted to it, and the present invention can be applied to other semiconductor devices, for example, a digital signal processor (DSP).

An Illustrative Embodiment

Hereinafter, the illustrative embodiment is explained.

(Additional Remark 1)

A semiconductor device including an interface circuit to perform a sequential communication of transmit or receive according to a synchronous clock.

In the semiconductor device, the interface circuit includes a first register to specify an operation enabled state which is at least one of a transmit state and a receive state, and a second register to hold information to specify a transmit determent or a receive determent, and at least one operation of transmit or receive of information is determined, based on the state of the first register and the state of the second register.

(Additional Remark 2)

A system including a first semiconductor device including a first interface circuit to perform a sequential communication of transmit or receive according to a synchronous clock and a second semiconductor device including a second interface circuit to perform a sequential communication of transmit or receive according to the synchronous clock.

In the system, the second interface circuit includes a first register to specify an operation enabled state as at least one of a transmit state and a receive state, and a second register to hold information to specify a transmit determent or a receive determent, and at least one operation of transmit or receive of information is determined, based on the state of the first register and the state of the second register.

What is claimed is:

1. A semiconductor device comprising:
   an interface circuit operable to perform a sequential communication of transmit or receive according to a synchronous clock,
   wherein the interface circuit comprises:
   a first register operable to specify an operation enabled state which is enabling at least one of a transmit state and a receive state; and
   a mode control circuit operable to change at least one mode of transmit or receive in the operation enabled state according to generated information to change the at least one mode of the interface circuit at a time of data transfer, based on data transfer information or contents of the data transfer, and
   wherein the mode control circuit changes among modes of a transmit and receive mode, a transmit mode, and a receive mode while in the operation enabled state.

2. The semiconductor device according to claim 1, wherein the interface circuit outputs a status, in response to a change of the mode.

3. The semiconductor device according to claim 1 further comprising:
   a second register operable to hold information to specify a transmit determent or a receive determent, in a transmit and/or receive state.

4. The semiconductor device according to claim 3, wherein the second register holds information capable of specifying one of command receive and data receive.

5. The semiconductor device according to claim 1, wherein the interface circuit is capable of outputting one of a data transmit completion interruption request, a command receive completion interruption request, and a data receive completion interruption request.

6. The semiconductor device according to claim 1 further comprising:
   a data transfer device,
   wherein the mode control circuit is controlled corresponding to a prescribed operation of the data transfer device, and changed to the at least one mode after the completion of a transmit operation or a receive operation, and
   wherein the mode of data transfer of at least transmit and receive is transitioned while in the transmit or receive state.

7. The semiconductor device according to claim 5 further comprising:
   a data transfer device,
   wherein the data transfer device is activated in response to one of the data transmit completion interruption request, the command receive completion interruption request, and the data receive completion interruption request.

8. The semiconductor device according to claim 7, wherein the data transfer device comprises:
   a register operable to store transfer mode information;
   a register operable to store first source address information and second source address information;
   a register operable to store destination address information; and
   an arithmetic circuit, and
   wherein the data transfer device performs a read, based on the result of arithmetic computations performed by the arithmetic circuit on data read based on the first source address information and the second source address information, and performs a write, based on the destination address information.

9. The semiconductor device according to claim 1 further comprising:
   a central processing unit;
   an interrupt control circuit; and
   a data transfer device,
   wherein the interface circuit makes an interruption request to the interrupt control circuit, and
   wherein, in response to the interruption request, the interrupt control circuit outputs an interrupt signal to the central processing unit or outputs a start request to the data transfer device.

10. A system comprising:
    a first semiconductor device including a first interface circuit operable to perform a sequential communication of transmit or receive according to a synchronous clock; and
    a second semiconductor device including a second interface circuit operable to perform a sequential communication of transmit or receive according to the synchronous clock,
    wherein the second interface circuit comprises:
    a first register operable to specify a transmit and/or receive state; and
    a mode control circuit operable to change at least one mode of transmit or receive in an operation enabled state enabling the specified transmit and/or receive state according to generated information to change the at least one mode of the second interface circuit at a time of data transfer, based on data transfer information or contents of the data transfer, and
    wherein the mode control circuit changes among modes of a transmit and receive mode, a transmit mode, and a receive mode while in the operation enabled state.

11. The system according to claim 10, wherein the second interface circuit outputs a status, in response to a change of the mode, and
    wherein the first interface circuit inputs the status.

12. The system according to claim 10,
wherein the second interface circuit further comprises:
a second register operable to hold information to specify a transmit determent or a receive determent, in the transmit and/or receive state.

13. The system according to claim 12,
wherein the second register holds information capable of specifying one of command receive and data receive.

14. The system according to claim 10,
wherein the second interface circuit performs the sequential communication of transmit or receive in synchronization with one synchronous clock outputted from the first interface circuit.

15. The system according to claim 10,
wherein the second semiconductor device further comprises:
a data transfer device, and
wherein the mode control circuit is controlled corresponding to a prescribed operation of the data transfer device, and changes the mode after the completion of a transmit operation or a receive operation.

16. The system according to claim 10,
wherein the second semiconductor device further comprises:
a data transfer device, and
wherein the data transfer device is activated in response to one of a data transmit completion interruption request, a command receive completion interruption request, and a data receive completion interruption request, made by the second interface circuit.

17. The system according to claim 16,
wherein the data transfer device comprises:
a register operable to store transfer mode information;
a register operable to store first source address information and second source address information;
a register operable to store destination address information; and
an arithmetic circuit, and
wherein the data transfer device performs a read based on the result of arithmetic computations performed by the arithmetic circuit on data read based on the first source address information and the second source address information, and performs a write based on the destination address information.

18. The system according to claim 10,
wherein the second semiconductor device further comprises:
a central processing unit;
an interrupt control circuit; and
a data transfer device,
wherein the second interface circuit makes an interruption request to the interrupt control circuit, and
wherein, in response to the interruption request, the interrupt control circuit outputs an interrupt signal to the central processing unit or outputs a start request to the data transfer device.

* * * * *